United States Patent
Chan et al.

(10) Patent No.: US 8,065,611 B1
(45) Date of Patent: Nov. 22, 2011

(54) METHOD AND SYSTEM FOR MINING IMAGE SEARCHES TO ASSOCIATE IMAGES WITH CONCEPTS

(75) Inventors: Wesley Chan, Mountain View, CA (US); Sumit Agarwal, San Carlos, CA (US); Rama Ranganath, Mountain View, CA (US); Leora Ruth Wiseman, Sunnyvale, CA (US); Deepak Jindal, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 598 days.

(21) Appl. No.: 10/880,375

(22) Filed: Jun. 30, 2004

(51) Int. Cl.
*G06F 17/00* (2006.01)
(52) U.S. Cl. ............... 715/253; 715/273; 705/14.25; 705/14.49; 705/14.67; 382/305
(58) Field of Classification Search .......... 715/500, 715/243, 253, 273; 705/14.25, 14.49, 14.67; 382/305
See application file for complete search history.

(56) References Cited

U.S. PATENT DOCUMENTS

| | | | |
|---|---|---|---|
| 5,535,382 A * | 7/1996 | Ogawa | 707/5 |
| 5,636,346 A | 6/1997 | Saxe | |
| 5,642,502 A * | 6/1997 | Driscoll | 707/5 |
| 5,694,592 A * | 12/1997 | Driscoll | 707/3 |
| 5,708,825 A * | 1/1998 | Sotomayor | 715/501.1 |
| 5,724,521 A | 3/1998 | Dedrick et al. | |
| 5,842,206 A * | 11/1998 | Sotomayor | 707/5 |
| 5,845,265 A | 12/1998 | Woolston | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,946,678 A * | 8/1999 | Aalbersberg | 707/3 |
| 5,948,061 A | 9/1999 | Merriman et al. | |
| 5,974,398 A | 10/1999 | Hanson et al. | |
| 6,026,368 A | 2/2000 | Brown et al. | |
| 6,044,375 A | 3/2000 | Shmueli et al. | |
| 6,061,659 A | 5/2000 | Murray | |
| 6,067,570 A | 5/2000 | Kreynin et al. | |
| 6,078,866 A | 6/2000 | Buck et al. | |
| 6,178,263 B1 * | 1/2001 | Fan et al. | 382/198 |
| 6,223,163 B1 | 4/2001 | Van Luchene | |

(Continued)

FOREIGN PATENT DOCUMENTS

EP  1026610 A2  8/2000

(Continued)

OTHER PUBLICATIONS

Google Introduces New Pricing For Popular Self-Service Online Advertising Program, http://www.google.com/press/pressrel/select.html, p. 1-2, dated Feb. 20, 2002, printed on Jul. 29, 2003.

(Continued)

*Primary Examiner* — Stephen Hong
*Assistant Examiner* — Matthew Ludwig
(74) *Attorney, Agent, or Firm* — Fish & Richardson P.C.

(57) ABSTRACT

A system and method for associating a document with a concept are provided. One or more idea-electronic document associations is identified, wherein each idea-electronic document association is based on a user performance criteria relative to the electronic document and the idea. At least one of the one or more electronic documents is identified with a concept based on the one or more idea-electronic document associations, wherein the concept is related to the one or more ideas.

25 Claims, 14 Drawing Sheets

U.S. PATENT DOCUMENTS

| | | |
|---|---|---|
| 6,230,170 B1 | 5/2001 | Zellweger et al. |
| 6,247,009 B1 | 6/2001 | Shiiyama et al. |
| 6,253,189 B1 | 6/2001 | Feezell et al. |
| 6,269,361 B1 * | 7/2001 | Davis et al. ................ 707/3 |
| 6,285,987 B1 | 9/2001 | Roth et al. |
| 6,298,348 B1 | 10/2001 | Eldering |
| 6,324,519 B1 | 11/2001 | Eldering |
| 6,336,132 B2 | 1/2002 | Appleman et al. |
| 6,421,675 B1 | 7/2002 | Ryan et al. |
| 6,460,034 B1 * | 10/2002 | Wical ........................ 707/5 |
| 6,907,566 B1 * | 6/2005 | McElfresh et al. ......... 715/210 |
| 6,971,973 B2 * | 12/2005 | Cohen et al. ................ 482/8 |
| 7,035,812 B2 | 4/2006 | Meisel et al. |
| 7,133,069 B2 | 11/2006 | Wallach et al. |
| 7,483,891 B2 * | 1/2009 | Liu et al. ..................... 1/1 |
| 7,698,266 B1 * | 4/2010 | Weissman et al. ...... 707/999.005 |
| 7,752,074 B2 * | 7/2010 | Bosarge et al. ............ 705/14.54 |
| 2001/0042064 A1 | 11/2001 | Davis et al. |
| 2001/0043717 A1 | 11/2001 | Laumeyer et al. |
| 2001/0047297 A1 | 11/2001 | Wen |
| 2001/0051911 A1 | 12/2001 | Marks et al. |
| 2002/0002509 A1 | 1/2002 | Wagorn et al. |
| 2002/0002525 A1 | 1/2002 | Arai et al. |
| 2002/0026359 A1 | 2/2002 | Long et al. |
| 2002/0035536 A1 | 3/2002 | Gellman |
| 2002/0038282 A1 | 3/2002 | Montgomery |
| 2002/0046099 A1 | 4/2002 | Frengut et al. |
| 2002/0046104 A1 | 4/2002 | Kaddeche et al. |
| 2002/0077891 A1 | 6/2002 | Castle et al. |
| 2002/0099605 A1 | 7/2002 | Weitzman et al. |
| 2002/0111898 A1 | 8/2002 | Numaoka et al. |
| 2002/0123988 A1 | 9/2002 | Dean et al. |
| 2002/0165773 A1 | 11/2002 | Natsuno et al. |
| 2002/0184097 A1 | 12/2002 | Hijiri et al. |
| 2002/0194062 A1 | 12/2002 | Linide |
| 2002/0198780 A1 | 12/2002 | Kawakami et al. |
| 2003/0037334 A1 | 2/2003 | Khoo et al. |
| 2003/0055816 A1 | 3/2003 | Paine et al. |
| 2003/0070167 A1 | 4/2003 | Holtz et al. |
| 2003/0083937 A1 | 5/2003 | Hasegawa et al. |
| 2003/0149618 A1 | 8/2003 | Sender et al. |
| 2003/0163372 A1 | 8/2003 | Kolsy |
| 2003/0216963 A1 | 11/2003 | Ishiwaka et al. |
| 2004/0015397 A1 | 1/2004 | Barry et al. |
| 2004/0019523 A1 | 1/2004 | Barry et al. |
| 2004/0044571 A1 | 3/2004 | Bronnimann et al. |
| 2004/0054577 A1 | 3/2004 | Inoue et al. |
| 2004/0054589 A1 | 3/2004 | Nicholas et al. |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0093620 A1 | 5/2004 | Iino et al. |
| 2004/0119740 A1 | 6/2004 | Chang et al. |
| 2004/0143499 A1 | 7/2004 | Dietsch et al. |
| 2004/0143843 A1 | 7/2004 | Khoo et al. |
| 2004/0167928 A1 | 8/2004 | Anderson et al. |
| 2004/0193915 A1 | 9/2004 | Smith et al. |
| 2004/0230898 A1 | 11/2004 | Blakely et al. |
| 2004/0249709 A1 | 12/2004 | Donovan et al. |
| 2005/0055344 A1 * | 3/2005 | Liu et al. ..................... 707/3 |
| 2005/0065806 A1 | 3/2005 | Harik |
| 2005/0071224 A1 | 3/2005 | Fikes et al. |
| 2005/0096979 A1 | 5/2005 | Koningstein |
| 2005/0114198 A1 * | 5/2005 | Koningstein et al. ......... 705/10 |
| 2005/0131758 A1 | 6/2005 | Desikan et al. |
| 2005/0131762 A1 * | 6/2005 | Bharat et al. ................ 705/14 |
| 2005/0137939 A1 | 6/2005 | Calabria et al. |
| 2005/0144069 A1 * | 6/2005 | Wiseman et al. ............ 705/14 |
| 2005/0165638 A1 | 7/2005 | Piller |
| 2005/0210009 A1 | 9/2005 | Tran |
| 2005/0216335 A1 | 9/2005 | Fikes et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |
| 2006/0122884 A1 * | 6/2006 | Graham et al. .............. 705/14 |
| 2006/0143176 A1 * | 6/2006 | Mojsilovic et al. ............ 707/6 |

FOREIGN PATENT DOCUMENTS

| | | |
|---|---|---|
| WO | WO 0038074 | 6/2000 |
| WO | WO 2004/042525 | 5/2004 |

OTHER PUBLICATIONS

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

Chris Sherman, "Google Launches AdWords Select," Feb. 20, 2002, 6 pages.

* cited by examiner

Create a Text Ad
Sample ad:
<u>Widget World</u>
Wide variety of widgets.
Order online.
widgetworld.google.com Headline (maximum 25 characters)

Description line 1 (maximum 35 characters)

Description line 2 (maximum 35 characters)

Display URL (maximum 35 characters)
http://

Destination URL (maximum 1024 characters)

Your ad will link users to this URL, which may differ from the above "Display URL" if you choose. URL should not generate pop-ups, and should allow one click return to Google using the browser's back button.

[ Save New Text Ad ]   [ Cancel ]

Or Create an Image Ad [ ? ]
Note: Image ads will only appear on content pages, not search pages.

Don't have an image to use? Use the <u>Image Ad Wizard</u>
If you have an image, complete the form below.

Select a size: <u>view examples</u>
○ 468 x 60 Banner          ○ 728 x 90 Leaderboard
○ 120 x 600 Skyscraper    ○ 300 x 250 Inline Select an image from your computer [maximum 50k file size]
Acceptable formats: .gif, .jpg, .png

[ Browse ]

Name this image (maximum 25 characters)    [ ? ]

Display URL (maximum 25 characters)
http://

Destination URL (maximum 1024 characters)

Your ad will link users to this URL, which may differ from the above "Display URL" if you choose. URL should not generate pop-ups, and should allow one click return to Google using the browser's back button.

[ Save New Image Ad ]   [ Cancel ]

FIG. 7

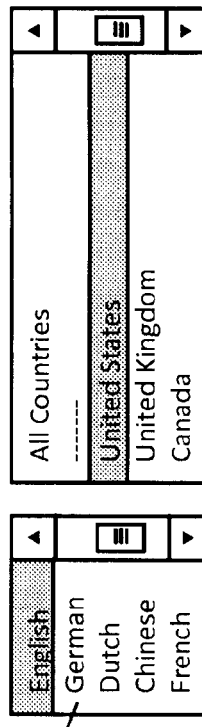

Keyword Suggestion Tool

1. What do you need?
   - ● High traffic -- find synonyms so your Ads show on more queries
   - ○ High clickthrough rates -- find more specific variations of a keyword
   - ○ Match type comparison -- see what queries show your Ad for each match type 2. ○ Start with keyword(s)

○ Start with an image

3. Select target language(s) and countries.

| English | | All Countries |
   | German  | | ------ |
   | Dutch   | | United States |
   | Chinese | | United Kingdom |
   | French  | | Canada |

1110

Hold down the control or option key to select multiple items.

[ Find Keywords ]    [ Cancel ]

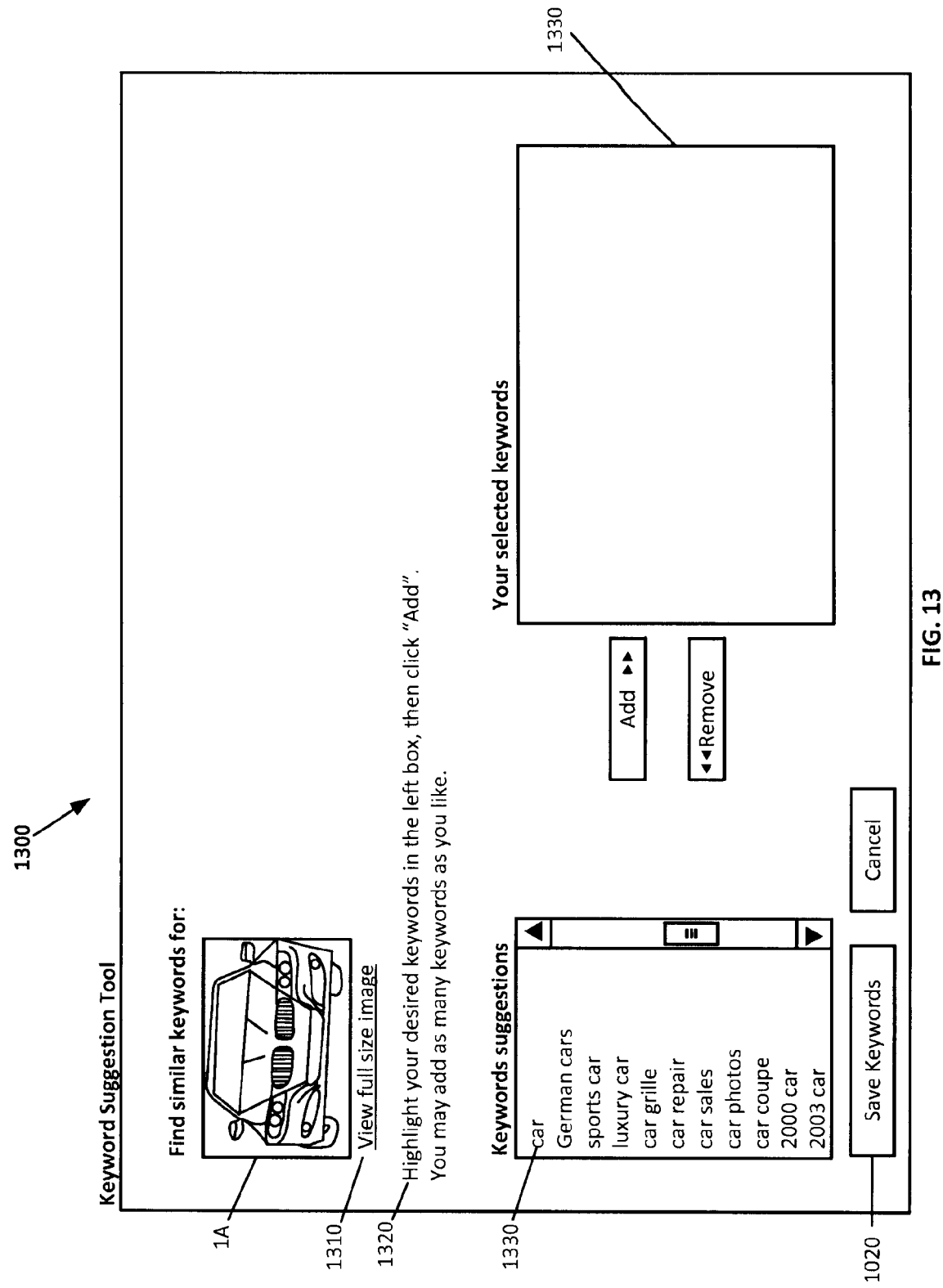

METHOD AND SYSTEM FOR MINING IMAGE SEARCHES TO ASSOCIATE IMAGES WITH CONCEPTS

RELATED APPLICATIONS

This Continuation-in-part of application claims priority to the U.S. patent application Ser. No. 10/841,835 entitled "Method and System for Providing Targeted Documents Based on Concepts Identified Therein" filed May 10, 2004, which is incorporated herein by reference. This application is also related to the U.S. patent application Ser. No. 10/880,322, entitled "Method And System For Automatically Creating An Image Advertisement".

FIELD OF THE INVENTION

The present inventions relate to automatically associating documents with concepts based on other document-concept associations.

BACKGROUND OF THE INVENTION

With the advent of the Internet, the amount of data accessible to users is far greater than what any person or entity could possibly identify or categorize through manual means. However, identification and categorization are needed to render the information usable. Because manual means are limited in scope and costly, automated systems and methods are needed to identify and process the vast quantities of available data.

Electronic text can be identified through automated means such as word searches in text-based documents such as the .html files that predominate the Internet. Indeed, the search engines that enable users to find data on the Internet typically use a word search. However, for electronic documents that are not in a text-based format, content identification and categorization become substantially more difficult. Optical character recognition (OCR) technologies can identify text in electronic documents that are not natively in a text format, such as .pdf files. Other imaging processes have been employed to electronically process either an image of a document or the electronic version of a document to identify the content of images. For instance, some software programs can identify the presence of flesh in an image and have reasonable success in separating pornographic images from images appropriate for all ages. However, such processes can be inaccurate, and they typically require substantial processing power. Further, such processes are entirely computer-based and therefore lack the pattern recognition capabilities, contextual knowledge, and judgment of the human brain.

These and other drawbacks exist with current systems and methods.

SUMMARY OF THE INVENTION

Accordingly, various embodiments of the present inventions may be directed to a system and a method for associating a document with a concept based on a one or more user associations of a document with the same or a related concept. One or more idea-electronic document associations is identified, wherein each idea-electronic document association is based on a user performance criteria relative to the electronic document and the idea. At least one of the one or more electronic documents is identified with a concept based on the one or more idea-electronic document associations, wherein the concept is related to the one or more ideas.

In another exemplary embodiment, a system for associating an electronic document with a concept is provided. An input device receives one or more idea-electronic document associations, wherein each idea-electronic document association is based on a user performance criteria relative to the electronic document and the idea. A database stores the one or more idea-electronic document associations. A processor associates at least one of the one or more electronic documents with a concept based on the one or more idea-electronic document associations, wherein the concept is related to the one or more ideas.

In another exemplary embodiment, a computer-readable medium encoded with computer program code to associate an electronic document with a concept is provided. The program code effective to perform the following: identify one or more idea-electronic document associations, wherein each idea-electronic document association is based on a user performance criteria relative to the electronic document and the idea; and identify at least one of the one or more electronic documents with a concept based on the one or more idea-electronic document associations, wherein the concept is related to the one or more ideas.

BRIEF DESCRIPTION OF THE DRAWINGS

FIG. 7 shows an exemplary interface according to an embodiment of the invention.

FIG. 11 shows an exemplary interface according to an embodiment of the invention.

FIG. 13 shows an exemplary interface according to an embodiment of the invention.

DETAILED DESCRIPTION OF EXEMPLARY EMBODIMENT(S)

Figure 1:
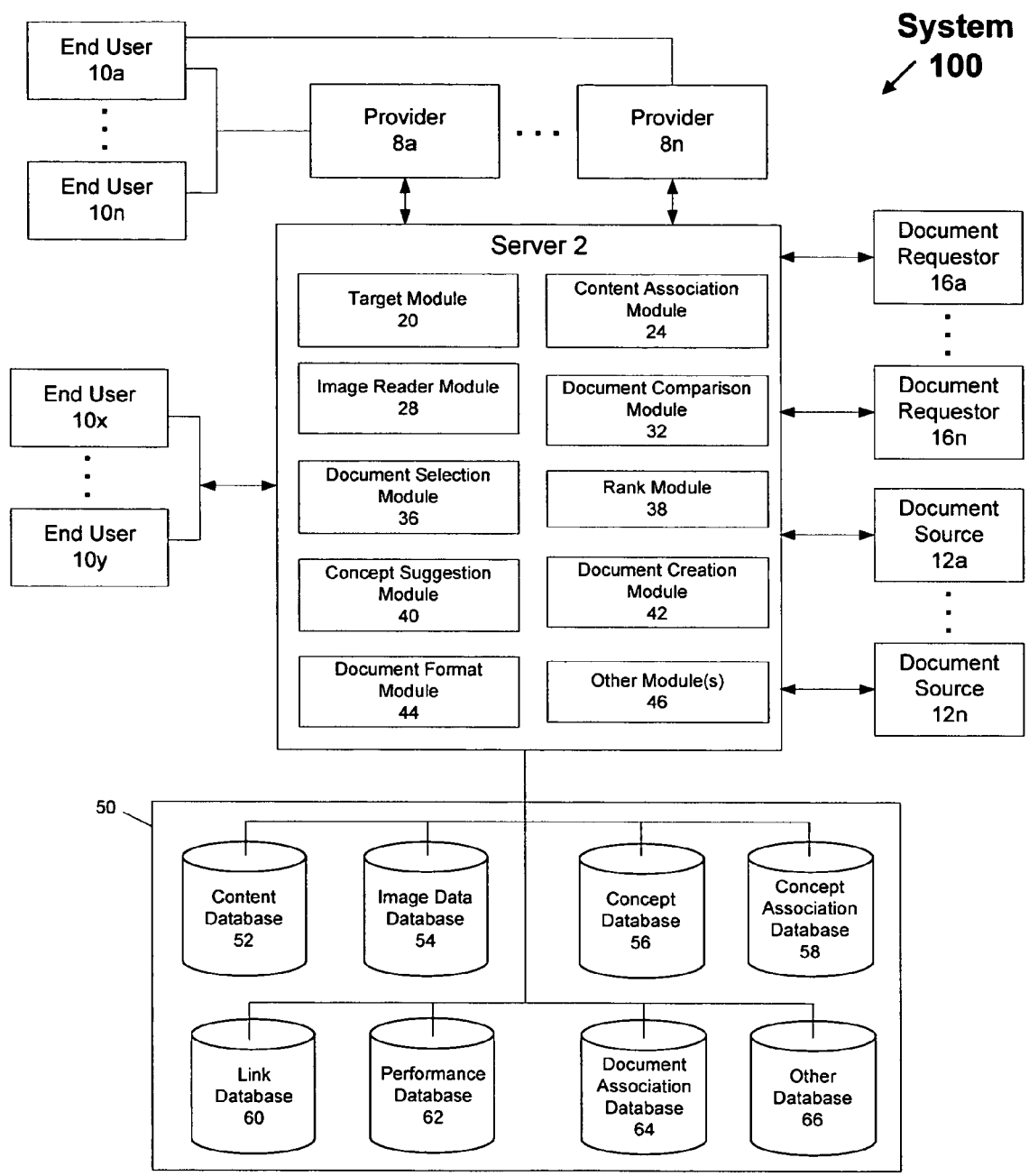
FIG. 1 depicts a system for targeting an electronic document according to an embodiment of the invention.

An embodiment of the present invention provides for associating an electronic document with a concept based on prior idea-document associations by users. By mining user association data, a server or other processing system may identify and/or categorize a large number of documents without otherwise reviewing or processing the documents themselves. In effect, each user of the Internet or other networked system may contribute to the identification of the documents contained therein by the user's idea-electronic document associations. The identifications and categorizations of documents may be based exclusively on user associations, or other factors may be used such as similarities or other relationships between unidentified documents and other documents.

Identifying images in electronic documents can be labor intensive and costly when human reviewers identify the images. Some embodiments of the present invention reduce the costs of identifying the content of an image. For instance, in some embodiments an image may be identified by mining user selections of the image from among a plurality of search result images associated with a search query idea, such as a person's name.

In some embodiments of the invention, the association data can be used for suggesting images or other documents to include in an image advertisement. A server may receive a request to create an image advertisement based on a supplied graphic or text. Based on user idea-image associations, the server may identify images related to the supplied graphic or text. The server may then suggest the identified images for the image advertisement. Keywords may similarly be suggested These actions may be performed automatically, i.e., by any machine-executable process and/or a process that does not require human intervention or input. When the concepts trigger relevant content or search results, the documents may be displayed based on a rank. For example, the documents may be ranked based on relevancy, performance parameter (e.g., click through rate (CTR), conversion rate, performance information, other measure of performance, etc.), price parameter (e.g., an amount an advertiser is willing to pay for each click, bid amount, price information, other measure of price, etc.), and/or other factors. Documents such as graphical advertisements may be targeted to search results and/or content pages (e.g., web pages, emails, print media, etc.) on a wide variety of sites and other display environments.

While the term "advertisement" and "ad" may be used as an illustrative example, it should be appreciated that the same system and method may be applied to other forms of documents or electronic documents. As used herein, the term "document" and "electronic document" may encompass one or more advertisements, content pages (e.g., web pages), search results, emails, applications, IM messages, audio content or files, video content or files, other files, other data or applications that may reside on one or several (e.g., a network) of computer systems, or other definable concepts or content. A "document" may also comprise a portion of a document.

Overview and System Architecture

FIG. 1 depicts a system 100 for associating documents with concepts and for providing an electronic document in a targeted manner based on the content of the electronic document and an indicated interest of the request responsive to which the electronic document (e.g., an advertisement) may be delivered targeting an electronic document according to an embodiment of the invention. The system may comprise: a server 2, one or more providers 8, one or more document sources 12, one or more end users 10, and one or more databases 50 operatively connected to server 2. As used herein, the term "concept" and "idea" may refer to a concept, image, word, document, sound, location, content, or other idea, or any combination thereof.

System 100 may enable server 2 to process content associations of electronic documents. Document sources 12, providers 8, and end users 10 may communicate with one or more servers 2 via electronic communication, including Internet communications. Document sources 12, providers 8, and end users 10 may include or have access to one or more servers 2 for providing functionality associated with electronic documents.

Information that may be communicated between and among server 2, providers 8, document sources 12, end users 10, and document requestors 16 may include one or more of the following: document information, document content information, content identification information, concept association information, document performance information, provider information, document similarity information, concept/keyword price information, performance information, document-concept association information, and other information. The document information may include one or more of the following: the document itself, audio-visual content (e.g., pictures of faces, song lyrics, etc.), identification of audio and/or visual content, concepts associated with the document or portions thereof, any language(s) used in the document, length information, information regarding the type(s) of files in the document (e.g., html, doc, zip, etc.), type of document (advertisement, educational document), summary information, pornographic content, other offensiveness content (e.g., use of potentially offensive words), the identity of the document owner and/or the document creator, information about the document's intended audience (such as geographic area, age range, gender, race, national origin, religion, other demographic information), and any other information related to a document or to the server 2, providers 8, or document sources 12.

In particular, providers 8, document sources 12, end users 10, and server 2 (collectively and individually, "associating entities") may generate document-concept and/or document-document association information for one or more documents and concepts. For instance, the associating entities may select a particular document from among a plurality of provided documents based on the documents' relevance to an identified concept, such as a search query. The fact that a specific document was selected from among a plurality of documents associated with a concept may be association data.

This information may be provided to and used by the server 2. For instance, the associating entities may receive a document, such as an image ad, from the server 2 (or provider 8) and then provide association information about the document (and/or other documents referenced or linked to in the document) to the server 2.

It should be appreciated that non-association data may also be a form of association data. For instance, if a document is rarely (or never) selected from among a group of documents associated with a concept, the document may be un-associated with the concept.

Document sources 12 may provide documents to server 2, or server 2 may "pull" or retrieve documents from document sources 12. For instance, the document source 12 may provide an image or advertisement to server 2 so that the server 2 may then provide the image or advertisement to one or more content providers 8, and the providers 8 may provide the ad to one or more end users 10 (or server 2 may provide the ad directly to the end user 10). Document sources 12 may include any content creator or content provider 8, such as an advertisement listings provider or server 2.

Document requestors 16 may request documents from the server 2. Document requestors may comprise end users 10, providers 8, document sources 12, and other entities. Document requestors 16 may request the server 2 to generate one or more documents such as image and/or text advertisements, web pages, emails, etc.

Providers 8 may provide documents to one or more end-users 10a-10n. Providers 8 may include a content provider, search engine or other entity that makes available information, services, and/or products over an electronic network, such as the Internet. A provider 8 may include one or more of the following, for example: an advertisement listings provider, an electronic document provider, a website host, a server 2, any other entity that provides electronic documents to users or other entities, or any other provider of content. A provider 8 may be a document provider 12.

Each of provider 8, document source 12, document requestor 16, end user 10, image reader module 28, document comparison module 32, other module 46, server 2, or other entity may comprise an associating entity. An associating entity may comprise an entity that associates a document with a concept (or otherwise communicates such an association). An associating entity may be one or more persons, groups, and/or processors. For instance, a user 10 may select a search result from a search result page displayed based on a search query, and it may accordingly associate the selected search result document with the search query concept. Providers 8 who pass user concept-document associations to the server 2 may comprise an associating entity. The providers 8 may be partners of an entity associated with operating server 2. An end user 10 may be one or more persons, computers, computer networks, or other entity on a network. An end user 10 may request and receive content from a provider 8 and/or server 2. Additional participants may be included based on various applications.

The server 2 may comprise any server 2, hub, central processor, provider, search engine, or other entity in a network. A database 50 coupled to the server 2 may include one or more databases 50-64. Also, databases 50-64 may comprise portions of a single database 50. It should be appreciated that the databases 50-64 may or may not be physically distinct. The server 2 and its modules 20-46 may store and access information stored in the database(s) 50-64.

Features of the server 2 and other system elements and methods are also disclosed in U.S. patent application Ser. No. 10/742,791 entitled "Method and System for Providing Targeted Graphical Advertisements" filed Dec. 23, 2003, U.S. patent application entitled "System and Method for Rating Electronic Documents" filed Mar. 30, 2004, U.S. patent application Ser. No. 10/841,827 (now U.S. Pat. No. 7,533,090) entitled "Automated Graphical Advertisement Size Compatibility and Link Insertion" filed May 10, 2004, U.S. patent application Ser. No. 10/841,834 (now U.S. Pat. No. 7,801, 738) entitled "System and Method for Rating Documents Comprising an Image" filed May 10, 2004, U.S. patent application Ser. No. 10/841,835 (now U.S. Pat. No. 7,697,791) entitled "Method and System for Providing Targeted Documents Based on Concepts Automatically Identified Therein" filed May 10, 2004, U.S. patent application Ser. No. 10/841, 833 (now U.S. Pat. No. 7,639,898) entitled "Method and System for Approving Documents Based on Image Similarity" filed May 10, 2004, and U.S. patent application Ser. No. 10/880,375 entitled "Method and System for Mining Image Searches to Associate Images with Concepts" filed Jun. 30, 2004. These applications are incorporated herein by reference in their entirety. The disclosures of these applications should not be interpreted to limit any of the features described herein.

A content database 52 may store documents and/or data related to the documents, such as portions, images, and text of documents. The content database 52 may also store patterns, rules, and programming usable by the image reader module 28 to identify patterns and images in image documents such as graphical advertisements.

The documents may be received from document sources 12 and/or providers 8. Documents may also be generated by the server 2. The documents may or may not be associated with one or more concepts.

An image data database 54 may store image data. The image data may be received from a document source 12, and the image reader module 28. For instance, the image reader module 28 may read image data and store it in the image data database 54. The image data database 54 may store images that are available for use by the general public, e.g., in image ads.

The image data database 54 may also store a wide variety of images and data used by Optical Character Recognition ("OCR") (e.g., OCR processors and/or software) and other image processors to process and identify text and images. For instance, the image data database 54 may store programs and files that define and describe various images and image types. The programs may also identify patterns in the document that can be used to compare the document to other documents (e.g., by comparing the patterns in one document to the patterns in another). The image data database 54 may store generic (and specific) images for comparison. For instance, the image data database 54 may store a generic image of an apple. The document comparison module 32 may process an image of a fruit and compare it to the stored image of the apple to determine whether the two images are sufficiently similar and accordingly determine whether the image can be classified as an image of an apple.

A concept database 56 may store concepts associated with documents. For instance, one or more concepts may be associated with a document by content association module 24, and image reader module 28. The associated concepts may be stored in this database 56. Document selection module 36 may access concept database 56 when selecting documents to distribute to end users and providers. For instance, in order to select a document associated with a specific concept, the document selection module 36 may access the concept database to match the specific concept with one or more concepts in the database. In this way, a document can be selected that is related to the specific concept.

A concept association database 58 may store document-concept associations (i.e., "concept association information") and other information generated by the image data module 28, as well as any other information that may be relevant to evaluating the strength of a document-concept association. For instance, the concept association database 58 may store information relating to number of clicks on a document, number of times a document has been provided, click through rate, etc.

A link database 60 may store linked documents as well as the links themselves. The links may comprise links used in text ads and image ads. Linked content may be associated with a document and may result in additional associations between documents and concepts. For instance, if a document is associated with a concept, a document linked to the original document may be associated with the same (or similar) concept.

A performance database 62 may store document performance information, such as click through rate (CTR), cost per click (CPC), revenue information, and other information. The performance database 62 may store data associated with cost per click (or other price parameter), including bid amounts, for each graphic and/or advertiser. Performance data may also comprise how often a document is selected from a plurality of documents associated with a concept.

A document association database 64 may store document-document association information. It should be noted that document-document associations are one form of document-concept associations (because documents are concepts as defined herein), so the information in this database may also be stored in database 58. Document-document association information may comprise any of the following: one or more documents associated with a particular document, one or more common concepts or associations of one or more documents, similarity ratings between documents, groupings of similar or related documents (e.g., advertisements for the same product or from the same document source 12, or images that are associated with a similar concept such as a particular movie), and other information regarding an association between and among one or more documents. The information may be received from the document comparison module 32 or another module. The database 64 may also store concept association information and performance-related information, such as the CTR of documents that are similar or related to each other as well as the concepts (e.g., keywords) associated with them. For instance, the database 64 may identify several image ads that have substantially identical content but different keywords and different CTRs. The concept suggestion module 40 may access the document association database 64 (or the concept association database 68) to determine suggested concepts for a document.

Other database(s) 66 may store other information related to the documents, links, linked documents, document associating entities, and other information.

The server 2 may comprise one or more modules to process documents and content, document ratings and other entity ratings, trust scores (e.g., of document sources), and other data. The modules of server 2 may store, access and otherwise interact with various sources of data, including external data, databases and other inputs. The modules of server 2 may comprise processors, databases, and other processing devices.

Target module 20 enables a document source 12 such as an advertiser to specify a target (intended) audience. For example, an advertiser may specify a preferred language, country or other demographic preference. The advertiser may want to reach potential customers through a content page, search results page and/or other type of page. Accordingly, the advertiser may select target criteria via the target module 20.

A content association module 24 may associate keywords, subject matter, ideas, images, and other concepts and content with one or more documents (or one or more portions thereof) or one or more other keywords, concepts, images, etc. The content association module 24 may associate keywords and other ideas with a document based on information received from the modules, databases, and entities described herein, or any other entity. In particular, the content association module 24 may receive information from an entity that associates a document with a concept. The module 24 may use this information to associate a concept with a document.

For instance, an end user 10 may select a document, such as a search result, from a plurality of documents associated with a concept, such as a plurality of search results received in response to a search query. The selected search result document may be associated with the search query concept. For instance, a user 10 may search an image database of a search engine for an image associated with search query "Abraham Lincoln". The search engine (e.g., server 2) may select a plurality of images (e.g., public images usable by the general public) from an image database (or otherwise access such images) and deliver the images to the user 10 in response to the query. The images may be selected because a title of the image or other image information was determined to be associated with the search query. The user 10 may then select a particular image document from the plurality of provided images. Based on the user's selection, the server 2 may associate the selected image with the concept "Abraham Lincoln". The server 2 may determine that because the user 10 selected one of a plurality of images associated with "Abraham Lincoln", the image document may be related to the "Abraham Lincoln" concept.

In this way, non-text documents or portions thereof may be identified or otherwise associated with words and other concepts. The server 2 may also determine additional information about documents and concepts based on document-concept associations. Based on language identification technology well-known in the art and other resources, the server 2 may identify that the concept "Abraham Lincoln" is associated with (or is identified with) a person named Abraham Lincoln. The server 2 may also determine that "Abraham Lincoln" is a famous person, e.g., based on the fact that there are a large number of images with his name in the title. Using the method described above, the server 2 may identify that an image is a picture of Abraham Lincoln. In the same way, a search for "Abraham Lincoln beard hat" may help the server 2 identify an image that contains a picture of Abraham Lincoln with a beard and wearing a hat.

The content association module 24 may also aggregate associations. For instance, if a large number of people select the same image of Abraham Lincoln in response to an "Abraham Lincoln" image search, then "Abraham Lincoln" may be identified with the image.

The aggregating methods and functions may be similar to those known in the art and/or described elsewhere in this application and the cited U.S. patent applications. For instance, a concept may not be identified with an image in a database until the image is associated with the concept a certain number of times or by a certain number of users.

A feedback mechanism (e.g., item 1D in FIG. 5) may also be used to identify images. In this case, an evaluator may provide feedback comprising information identifying one or more images or other content in the document. This information may be used by the content association module 24 to associate a concept (e.g., identification information) with the identified images or the document as a whole.

Images and other documents associated with a concept may be provided when a document associated with that concept (or a related concept) is requested. For instance, if a document requestor 16 (e.g., a user 10 or provider 8) requests an image advertisement associated with car wax, one or more images of a car may be provided. The image of a car may be identified by the associating systems and methods described herein.

Any kind of document or content may be associated with other documents and content. For instance, any user selection (e.g., selected document) may be associated with the user or with information associated with the user. For instance, if a user 10 is known to be a botany enthusiast (or is otherwise strongly associated with plants), then documents selected by, stored by, viewed by, or otherwise associated with the user 10 may be associated with botany. Images viewed by the user 10 may be identified as being more likely to be images of flowers. Products purchased by the user 10 may be (loosely) associated with the concept of plants. Links selected on a web page may be determined to be more likely to be related to botany than other links on the page.

In short, every choice made by a human (or processor) can be the basis for associating (a) information associated with the chooser with (b) information associated with the choice, such as the chosen object or concept. Such associations may be stored in the content association module 24.

The association information may be used in selecting content to provide to users 10, providers 8, and other entities. In particular, the associations can be used to determine the preferences (e.g., consumer preferences) of a person. For instance, ads may be targeted to a specific individual based on concepts associated with the individual or concepts associated with features of the individual such as the individual's neighborhood, age, or other information.

For instance, the concept association module 24 may determine that males (or another identifiable group) are more likely to select documents of one type (sports-related documents) than another type (home decoration-related documents). Accordingly, the concept of sports may be associated with the male gender. When a male requests a document, the server may assign a preference to sports-related in selecting and ranking content for provision to the male user. Groups may be identified by any common feature, such as geography, identified preferences, occupation, hobbies, time zone, gender, age, nationality, language, etc.

The content association module 24 may receive information describing the text and images of an image ad from the image reader module 28 or other entity. This may occur after the image is processed by the image reader module 28. Based on the information describing the text and images (or other content), the content association module may associate keywords with the document. In the case of the image and text of the image ad of FIG. 5, the content association module may associate the ad with the keywords "8 mm film," "16 mm film," and "35 mm film," and "film equipment." The content association module 24 may store the content associations in the concept database 56. When a document associated with a concept is subsequently requested, a document may be selected (e.g., by the document selection module 36) that has keywords related to the concept. For instance, if a document associated with "4 mm film" is requested, the document of FIG. 5 may be provided because "4 mm film" is closely related to the identified keywords associated with FIG. 5. For instance, the concept "4 mm film" and the keywords of FIG. 5 may be closely related in semantic space.

In some embodiments, the content association module 24 may receive preference information from document sources 12. For instance, one document source 12a, such as an advertisement listings provider, may request that a particular image ad provided by the source 12a (e.g., the ad shown in FIG. 5) be associated with the phrase "digital film". The content association module 24 may accordingly associate the image ad with the phrase "digital film," or any other requested keyword or subject matter of interest.

In some embodiments, the content association module 24 may associate documents with concepts and/or subject matters of interest based on information received from the concept suggestion module 40. For instance, the concept suggestion module 40 may indicate that the ad shown in FIG. 5 should be associated with the word "film".

Image reader module 28 may comprise one or more computers or data processors equipped with one or more optical sensors. The optical sensors of the image reader module 28 may be equipped to identify and/or read optical data from the image of the document (e.g., from a picture or photocopy of an image ad). It may perform these functions automatically. The image reader module 28 may also process a computer file storing the document or image (e.g., a .pdf or .tif file) rather than optically reading a physical embodiment of the document. In some embodiments, an optical sensor may first "read" a physical embodiment of the document and convert optical image data into a file (e.g., a .pdf file, .tif file, or other image file format). In other words, the image reader module 28 may "read" and process the image information of a document in a manner analogous to how a human's eyes and brain read and process text and images from a page of a newspaper.

The optical sensor may use a laser, scanner, or other optical input device to read and capture image data from a physical embodiment of the document (e.g., a paper copy of a text document, or a photograph of an image). Scanners that convert images into electronic files (e.g., .pdf or .tif files) are well known in the art. The image reader module 28 may then process the file. For instance, the optical processor may use OCR to recognize or identify patterns in the stored optical data. Some types of OCR involve the translation of optically scanned bitmaps of printed or written text characters into character codes, such as ASCII.

By processing optical data from the image of the document, various optical scanning technologies may enable the optical processor to identify characters and images from the document. For instance, OCR technology (e.g., OCR scanners and software) may enable an image reader module 28 to identify text characters in a document.

Instead of identifying merely text and other "characters", the module 28 may recognize and identify images. For instance, the module 30 may read an image and determine that the image contains a picture of a film projector, a bottle of beer, a person (in varying states of dress), or another object.

The image reader module 28 may accordingly identify specific images (e.g., a famous person's face, a ham sandwich, a soft drink, a pizza, a location such as a schoolyard, etc.) by identifying patterns in an image or other document, such as geometric patterns. Geometric and other patterned rules for recognizing content may be stored in the image data database 54.

The module 28 may also determine other optical data relating to the image, such as image colors, color schemes, patterns, and other information.

An advantage of using the module 28 to determine concept association information is that concept association information can be determined (e.g., automatically, without human intervention). Because the server 2 may receive and distribute thousands, millions, and/or billions of different documents, the transaction and administrative costs of manually reviewing each document may be prohibitive and/or expensive.

It should be further understood that the image reader module 28 may be configured to process and identify concepts based on sounds, animations, video, pop-up ability, and other audio-visual information in documents. Accordingly, the module 28 may further comprise speakers, microphones, and audio/video processors.

The image reader module 28 may accordingly be used to associate concepts with a document as discussed above. These associations can be used when a document is requested from the server 2, e.g., by the document requestor 16, provider 8, or end user 10. For instance, if provider 8 requests an image of an apple, the server may identify an image associated with the word "apple" based on the concepts associated with the image and deliver the image to the provider 8.

Similarly, the image reader module 28 may be used to search for images of an apple (or images or other documents otherwise associated with a concept). When an image associated with a concept is requested, the image reader module 28 may process images in a database (e.g., content database 52 or image data database 54) to find one or more images associated with the requested concept (e.g., "apple"). In other words, the concepts need not be pre-associated with the images.

The image reader module 28 may use different algorithms to search for different types of content. For instance, one processing algorithm may be used to search for images of persons, and another processing algorithm may be used to search for images of real estate. Also, different algorithms may be used based on the type of media, e.g., a full motion video document may require different searching and processing algorithms than a still images document.

A document comparison module 32 may compare a document (e.g., an image or portion thereof) to one or more other documents (e.g., images or portions thereof stored in the content database 52 and image data database 54). Specifically, the document comparison module 32 may compare an image from one document source 12*a* to one or more documents from the same document source 12*a* already stored in the content database 52 or image data database 54. For instance, the document comparison module 32 may determine whether a document is identical to (or substantially identical to) another document. The document comparison module 32 may also determine a degree of similarity between two or more documents (e.g., that a document is 80% similar to another document).

The document comparison module 32 may compare two or more documents by comparing processed data associated with the images. For instance, the module 32 may process image data files received from the image reader module 28. The document comparison module 32 may compare the images, text, formatting, and patterns of one document to that of another. For instance, the module may identify that two different documents contain the same (or similar) image of an apple and the same (or similar) text describing an orchard.

The document comparison module 32 may determine a similarity rating between two or more documents and associate similar documents with each other. It should be noted that similarity ratings are a form of association between documents.

Accordingly, the document comparison module 32 may identify concepts (e.g., text, images, sounds, etc.) in one document by identifying the concepts of a substantially similar or identical document.

For example, one or more human associating entities may associate a first document with several concepts, such as an apple, an orchard, and a peach. Also, the advertisement listings provider may bid on the keywords "red apple" for the first document. This information may be stored in the content database 52, the concept database 56, and the document association database 54. The document comparison module 32 may identify that a second document is substantially identical to this document, e.g., because the second document has nearly identical text and images (regardless of whether the document comparison module can identify the actual content of the images). Because the two documents are similar and the first document is associated with "red apple," "orchard," and "peach," the second document may be associated with the same concepts.

It should be understood that a document may be associated with concepts other than words. For instance, a document can be associated with images, sounds, and patterns. For instance, a vacation advertisement can be associated with sound files of seagulls and waves crashing on a seashore, and pornographic advertisements can be associated with patterns that indicate a high presence of human flesh (and nudity).

Although one document may be determined to have nearly identical text and images but different formatting, the document comparison module 32 may determine the (relative) equivalence of the two documents. For (substantially) identical documents, the image reader module 28 may indicate that the document is (substantially) identical to another document and identify the other document. If a first document is identified to be substantially identical to a second document already stored in the database, it may receive the same concept association information as the first document. Further, if a document contains an image (such as an apple) that is nearly identical to a stored image (another apple), the document comparison module 32 may determine that the document contains an image of an apple. The content association module 24 may accordingly associate the document with the keyword "apple," and/or the concept suggestion module 40 may accordingly suggest that the document be associated with the concept "apple."

It should be appreciated that two documents may be similar or substantially identical, or at least the content of the two documents may be similar or substantially identical, even if the documents have different sizes, shapes, formats, colors, or other physical features.

A document selection module 36 may select and provide documents in response to a request for content from a provider 8, end user 10, or other entity. For instance, a children's book retailer may request an advertisement to display on their site. In response, the document selection module 36 may select a document based on information associated with the requestor or request (e.g., one or more concepts associated with the request).

The document selection module 36 may identify recipient information, e.g., by inspecting "cookies" on an end-user's computer. For instance, the document selection module 36 may identify preferences of an end user 10 based on prior information received from the end user, such as concept association information for a prior provided document. Information enabled or identified by the document selection module 36 may be stored in the concept association database 58.

Figure 6:
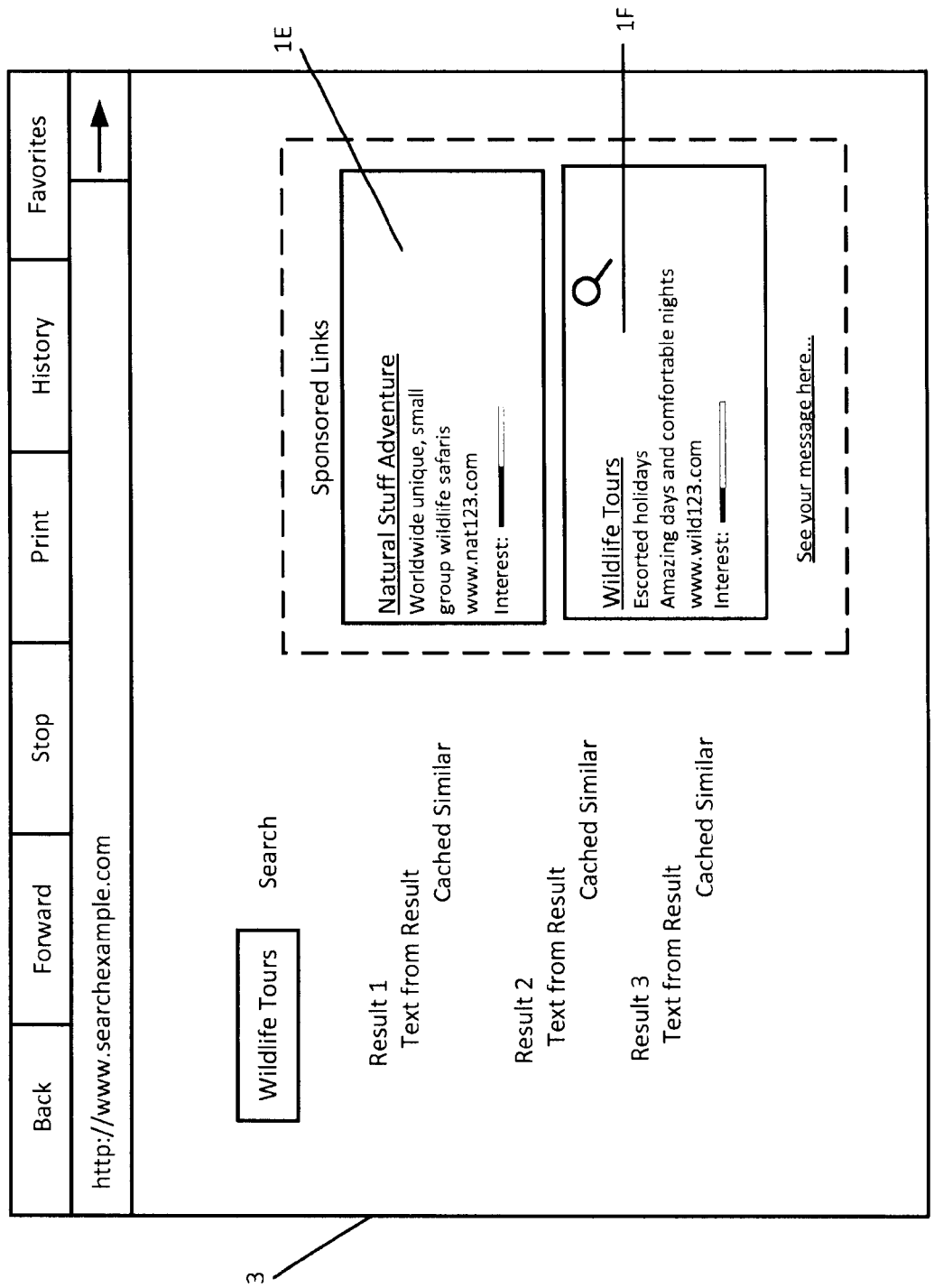
FIG. 6 depicts an exemplary document showing an ordered ranking according to an embodiment of the invention.

A rank module 38 may determine a rank of the ad, graphic, or other document. The rank of the document may refer to the placement of the document, or the placement of one or more documents within one or more other documents. For instance, a higher ranked document may be displayed in a position higher (e.g., closer to the top of a web page) than another document. In FIG. 6, advertisement 1E may be considered to be displayed in a higher rank than advertisement 1F. The rank of a specific document may be based on performance and pricing information of the document, the document source, the relevance of the document to a requested concept, and other criteria.

The rank module 38 may determine the rank (ordering) of a plurality of ads. It also may determine the rank of search results or other documents. For instance, a link to the web pages most closely related to a search query may be ranked higher than those that are not in a search results page. The rank of a document (or document link) may be determined by any information associated with the document. In particular, the rank of a document may be based on association information determined by the content association module 24 and/or stored in the document association database 64. For instance, search result images may be ranked according to how strongly they are associated with a particular concept, based on prior user associations of the document with the concept (or related concepts). Thus, if a particular image is usually selected by users who search for "Britney Spears," then this image will likely be ranked very high when someone searches for images of "Britney Spears."

Generally, the higher (or more prominently) the document is displayed, the more likely an end-user will be to take notice, thereby improving the potential for a click through (e.g., an end-user clicking on the document). According to one example, the ranking of the document may be determined by multiplying the cost per click (CPC) and the click through rate (CTR). Other methodologies for ranking documents may be implemented. For example, other price parameters and/or performance parameters may be considered.

Based on differences in customer behavior, the performance parameter for content pages and search pages may be different. Other adjustments may be applied for different types of pages.

An auction process for determining which advertisement to show in which placement may become more complicated as the pricing for graphical advertisements may have a premium associated with the display. For example, placement of advertisements may be based on a click through rate and cost per click (e.g., bid amount or any amount offered by an advertiser) combination (e.g., CTR*CPC). In another example, advertisers may be charged a higher rate for graphical advertisements based on a higher likelihood that the advertisement would be selected. Further, additional costs may be associated for additional enhancements (e.g., animation, sound, music, size, shape, etc.) or other features that may increase the advertisement's likelihood of being selected.

In addition, rank module 38 may also determine a position for the graphical advertisement or other document. Some advertisements may be displayed as a banner, across the top of a page (e.g., search page, content page, etc.), along the side of search results, and anywhere else on the page.

A concept suggestion module 40 may suggest concepts to associate with a document. For instance, the concept suggestion module 40 may identify concepts or subject matters of interest that may be associated with (and/or included in) a particular document. The module 40 may pass these suggestions to a document source 12, content association module 24, document creation module 42, document requestor 16, and/or other entities. The document requestor 16 (or other entity) may then select one or more concepts and/or subject matters of interest based on the suggested concepts.

To identify suggested concepts to associate with (e.g., include in or suggest to be included in) a particular document such as an image ad, the concept suggestion module 40 may process document information (or document request information) from the document requestor 16, document creation module 42, concept database 56, link database 60, performance database 62, document association database 64, and any other database 66 or entity. For instance, the concept suggestion module 40 may suggest one or more keywords, images, subject matters of interest to associate with a specific document based on any of the following factors: (1) the text, images, links, and other content identified in the specific document; (2) the keywords and/or subject matters of interest selected for and/or associated with similar documents; (3) the performance of the similar documents (e.g., based on keyword and document similarity); (4) the performance of the specific document (e.g., the document's CTR using a particular keyword); (5) the performance of related or similar documents using a specific keyword (such as the CTR for a similar document using a specific keyword); (6) the cost of a particular concept of keyword; (7) and any other factors.

The concept suggestion module 40 may rate a variety of suggested concepts. For instance, the module 40 may suggest that the document of FIG. 5 be associated with the word "film" and "8 mm," but the module 40 may also indicate that selecting the word "film" is most likely to lead to the highest CTR.

Document creation module 42 may create documents such as text and image advertisements. The documents may be created at the request of document requestor 16 or any other entity. Document creation module 42 may receive a request to create a document from document requestor 16. Requestors may specify concepts such as keywords, text, and images to associate with one or more generated documents. Document creation requests may also specify formatting and other criteria and preferences, such as the font, size, shape, color, and language of images, text, and other content that may be included in a document. Document creation requests may also specify other preference information associated with a document, such as a bid amount, conversion rate, keyword, or other information. Document creation module 42 may use interfaces such as those shown in FIGS. 7-13 during the document creation process. The module 42 may accept concepts, preferences, and other inputs from the document requestor 16.

Document format module 44 may format (or re-format) documents. Documents may be formatted according to display requirements or the preferences of content requestors or providers. Document format module 44 may format (or re-format) the font, size, shape, color, and language of images, text, and other content that may be included in a document. For instance, a document of one resolution may be requested for display in a document that requires a different resolution. Document format module 44 may re-format the document so that it conforms to the appropriate resolution or other formatting constraint.

Other module(s) 46 may accomplish other functions related to targeting and/or rating electronic documents. Several additional server 2 and system 100 functions are described in the U.S. patent applications cited herein.

Illustrative System Network Environment

Figure 2:
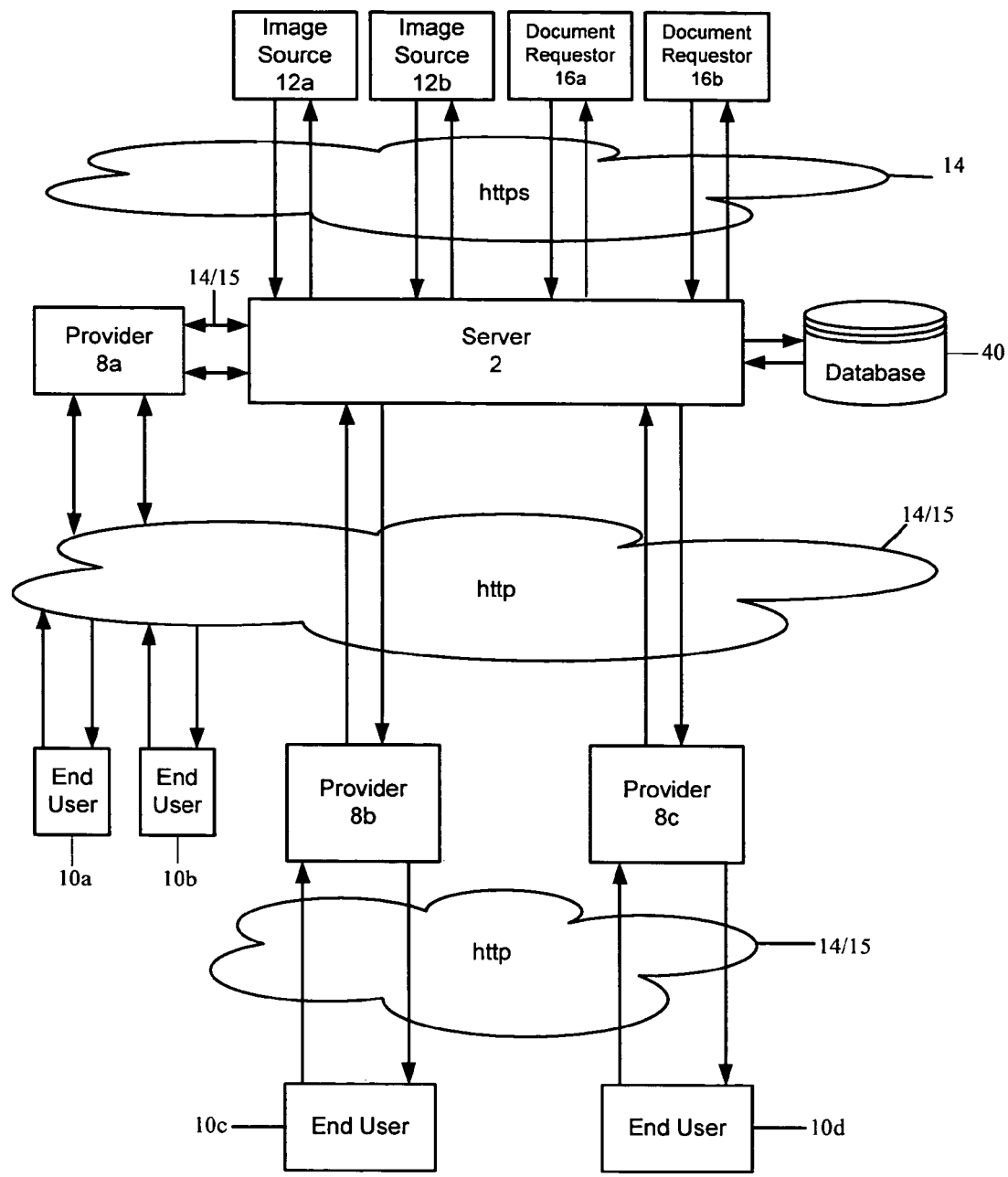
FIG. 2 depicts a networked environment for operation of a system for targeting an electronic document according to an embodiment of the invention.

FIG. 2 depicts a networked environment for operation of a system for targeting an electronic document according to an embodiment of the invention. In such an environment, associating entities and providers 8 may connect over a network 14, 15 to a server 2 (e.g., using a secure https connection) to provide documents and concept association information to server 2 and to receive documents and rating request information from server 2. The server 2 may store the document, rating, and performance information in a database 50. The server 2 may distribute the documents through various forums or feeds, including direct distribution in print media, providing the documents on one or more web sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, associating entities, providers 8, and document sources 12 may comprise computerized systems that include one or more of the following systems: a web server 2, a database server 2, proxy server 2, network balancing mechanisms and systems, and various software components that enable the system to operate on the Internet or other network type system. Additionally, networks 14 and 15, although depicted as http networks, may comprise other networks such as private lines, intranets, or any other network. In an exemplary embodiment, the connection between a document source 12 such as an advertisement provider and server 2 (and other connections such as between a provider 8 and server 2) may comprise secure network connections to insure that data is not subject to attack or corruption by any hacker or other third party. In addition, whereas two associating entities and two document providers 12 are depicted, it should be appreciated that one or more associating entities and one or more document providers 12 may be provided in the network. Similarly, although one database 50 is depicted, it should be appreciated that multiple databases 39 may be provided and that such databases 39 may be connected to the server 2 via any type of network connection, including a distributed architecture for server(s) 2.

Similarly, provider 8a may comprise any number of such systems connected to the associating entity or server 2 via any type of network, including an http or https network. Content provider 8 may comprise a system such as server 2 that provides functionality for enabling connection over the Internet or other network protocols. End users 10 may comprise any user (such as users connected to the Internet) and may comprise computerized systems that enable that connection through any of various types of networks, including through Internet service providers, cable companies, and any other method of accessing data on the Internet. Providers 8 may comprise any system that distributes content such as advertising to end-users 10.

Illustrative Associating Process

Figure 3A:
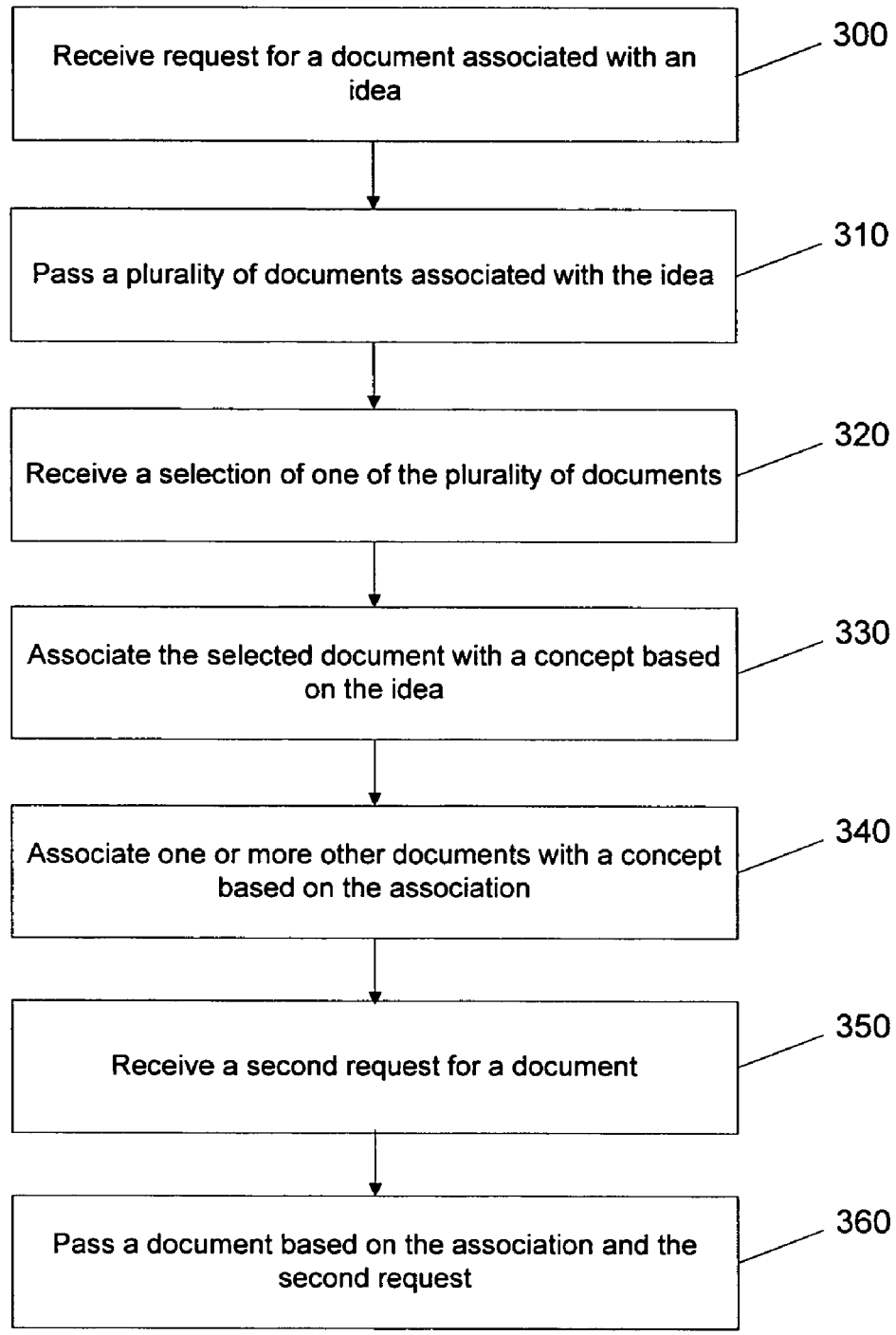
FIG. 3A is a flow chart illustrating an exemplary method for associating a document with a concept according to an embodiment of the invention.

FIG. 3A is a flow chart illustrating an exemplary method for associating a document with a concept.

In block 300, a request for a document associated with an idea is received. For instance, an end user may request the document from a server. The request may be a request for search results (e.g., images) associated with a search query on a web page. The search query idea may be "Star Wars actors."

In block 310, a plurality of documents associated with the idea are passed. The documents may be passed from the server to the end user (e.g., via a provider). The plurality of documents may be a plurality of images or other documents associated with the search query.

Each search result may comprise an image and a link to a document associated with the image (e.g., an expanded view of the image on a web page). For instance, the search results may comprise a plurality of images associated with Star Wars. These may include images and movie clips from the movie containing images of the actors, pictures of one or more Star Wars actors in another movie, images from the sequel "Empire Strikes Back," or other images related to (or not related to) Star Wars actors.

The search engine may select these images because the images have "Star Wars" and/or "actor" in the title. The search engine may also identify terms associated with "Star Wars actors," such as "Harrison Ford" (an actor in Star Wars), and select images with those terms in the title. Because some images may have improper titles, the search engine may select an image of a doorknob instead of a Star Wars-related image because the image was improperly titled "Star Wars cast" or "Carrie Fisher" (a Star Wars actress).

The selected images may be provided to the user. For instance, a plurality of compressed images may be provided on a search results page. Each compressed image may comprise a link to a full-page image of the compressed image.

In block 320, a selection of one of the plurality of documents is received. For instance, the server may receive a selection from the end user of one of the plurality of images. The end user may click on a link associated with the image, and the click may trigger a request for the server to provide the user with the selected document (e.g., a web page document associated with the link). In the example above, the user may select an image of Mark Hamill holding a light saber.

In block 330, the selected document is associated with a concept based on the idea. For instance, the selected document may be associated with the idea itself or a concept related to the idea. In the example above, the picture of Mark Hamill may be associated with "Star Wars," which is related to the idea "Star Wars actor."

The selected document may be processed to identify concepts associated with the document. For instance, an image processor may process an image document to identify images and text in the image. If the Mark Hamill image had the words "jedi knight" at the bottom, the image processor might identify these words using OCR technology. Then, based on the fact that the words "jedi knight" are in the image and a user selected the image after querying "Star Wars actor," the server might associate the image with "Star Wars," "jedi knight," "Mark Hamill," and "Alec Guinness" (another actor who played a jedi knight in Star Wars).

Regardless, the one or more associations are based in whole or in part on the selection in block 320. Alternately, un-selected documents may be un-associated with the concept.

In block 340, one or more other documents are associated with a concept based on the association. For instance, related documents may be associated with a concept that is the same as or related to the concept associated with the selected document. For instance, an image document that is determined to have a substantially similar image to that of the selected document may also be associated with "Mark Hamill."

The selected document may be processed to determine whether other documents are similar. Documents with a similar title (or other feature) may be associated with the original search query or another concept related to the selected document.

It should be appreciated that "associate" may comprise "identify." The content of an image may be identified (and thus "associated" with the identified material) based on user associations rather than a first-hand determination of the content of the image (or other document). If two million people who search for "Britney Spears" click on the same image search result, it can be reasonably inferred by the server that the image comprises a picture of Britney Spears.

Even first-hand determinations of the content of a document (e.g., an image) can be informed by user associations. While a person or image processor may identify that an image contains Luke Skywalker and a light saber, it may not be able to associate this image comes from a scene where Luke trains under Obi Wan Kenobi in the Millenium Falcon. However, user associations can make these connections. For instance, if 9 out of 10 users select this image from a plurality of search results related to the search query "Luke Skywalker Ben Kenobi training Millenium Falcon," a server may associate the image with each of these terms or intelligent combinations thereof (e.g., it may associate the image with an interior image of the Millenium Falcon rather than an exterior image, and it may recognize that Luke rather than Ben is engaged in training).

It should be appreciated that the document associations may change as new information and associations are received. For instance, a new association for one document may change the associations of a related document.

In block 350, a second request for a document is received. This block may function in the same manner as block 300. Another user may request a search result related to a second query. The second query may comprise "Star Wars jedi."

In block 360, a document is passed based on the association and the second request. This block may function in a manner similar to that described for block 310. However, at least one document that is passed is based on the association.

In the above example, the Mark Hamill image may be provided along with a plurality of other search result images. The Mark Hamill image may be selected for inclusion based on its prior association with the words "Star Wars actor." Without the prior association, the server may not have recognized that the Mark Hamill image is related to Star Wars whatsoever.

Even if the Mark Hamill image may have been recognized as a relevant search result, the image may be displayed in a higher rank based on the strength of its association with the keywords in the search. The prior association may have effectively strengthened the association between the image and the term "Star Wars." Thus, the image may appear $2^{nd}$ from the top instead of $7^{th}$ from the top of the web page search result.

Illustrative Document Generation Process

Figure 3B:
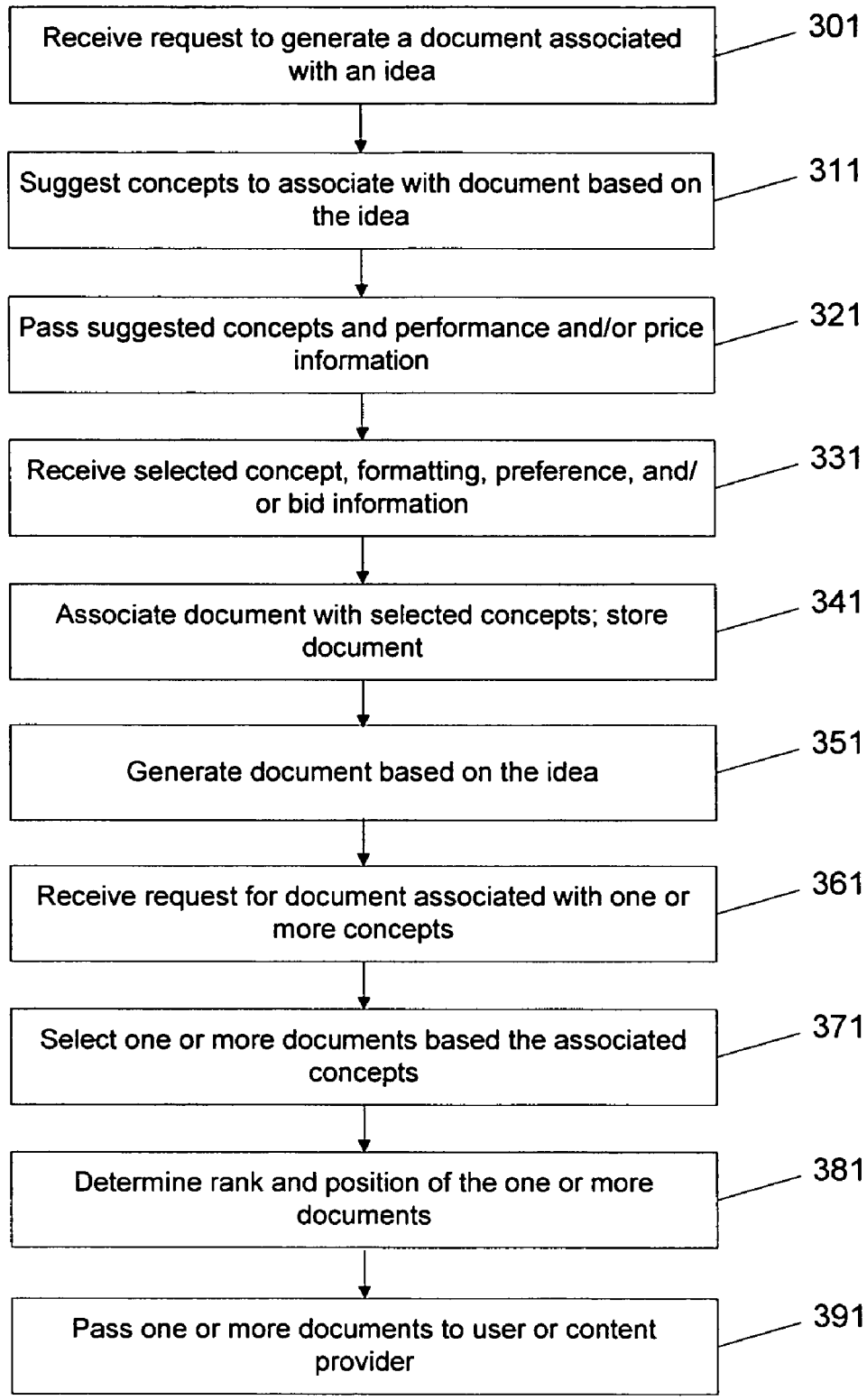
FIG. 3B is a flow chart illustrating an exemplary method for generating a document based on a concept according to an embodiment of the invention.

FIG. 3B is a flow chart illustrating an exemplary method for generating a document based on a concept.

In block 301, a request to generate a document associated with an idea is provided. The request may be made by a document requestor (such as an advertiser). The request may comprise a request for the server to generate a text and/or image advertisement based on an idea/concept such as the advertiser's slogan, product name, or other concept. The document requestor may access a server website to make the request. The server may prompt the document requestor for information related to the request, such as the idea associated with the request.

For instance, the server may request the name of the product, description of the product, product features, and the company motto. The document requestor may provide those items, e.g., in a request field on the web page. Some of the information that may be requested and/or provided is shown and described with respect to FIGS. 7 and 8.

For example, an advertiser may submit an image of a car wax product and a description that says "car wax." The advertiser may also indicate that the car wax "has superior durability and longevity and keeps your paint looking new!" It should be noted that information provided by the requestor may collectively be considered a "concept" for purposes of this application.

A template of the document may be generated for purposes of creating the document in real-time as the requestor inputs additional information.

In block 311, concepts that may be associated with the document based on the concept are suggested. For instance, the server may identify keywords, images, text, and/or other concepts that may be associated with (and/or included in) the document to be generated. The images may be selected based on the suggested concept. For instance, the server may suggest a plurality of images of shiny sports cars to include in the ad based on the association between shiny sports cars and "car wax," "paint," and "new." Suggested images may be presented in any format, such as that shown in FIG. 9. The server may suggest keywords such as "car wax," "carwax," and "car maintenance." Suggested keywords may be presented in any format, such as the format shown in FIG. 13. The server may also suggest text and formatting for the ad, such as header in the upper left of the ad that states either "great deals on car wax" or "keep your car shiny and healthy."

In block 321, performance and/or price information is passed, e.g., to the document requestor. For instance, the prices of suggested keywords may be passed. Other information such as formatting options may be passed to the requestor. This block 321 may occur at the same time as block 311.

In block 331, preference, bid information, and/or selected concepts are received, e.g., from the document requestor. For instance, document requestor may select (and/or bid on) one or more keyword concepts to associate with the ad. The document requestor may also select one or more of the images suggested by the server. For instance, the document requestor may also select an image of a red Porsche for inclusion in the ad. The document requestor may also select text to include in the ad that states "great deals on car wax." The document requestor may also select the keywords "car wax" and "carwax."

The document requestor may also select the size, resolution, font, and other features of the image ad or other document. For instance, the car wax company may request a banner ad format and size, as well as a sound that plays when the banner ad is displayed.

In block 341, the document is associated with selected concepts. For instance, the document may be associated with the selected keywords and the associated bid prices.

In block 351, the document is generated based on the various inputs. For instance, the server may generate the document based on the selected images, format, and text. It should be appreciated that the document may be generated over a period of time. For instance, the document may be generated as a document requestor navigates through the various fields of a web page as shown in FIGS. 7-13. The resulting document may be an image ad, such as the image ad 1 shown in FIG. 5.

The document may also be stored.

In block 361, a request for a document associated with one or more concepts may be received. This action may occur in a manner substantially similar to that described for blocks 300 and 350. For instance, an end user may submit a search query on a search engine website or request a website or other document. The search query may comprise "car wax polish."

In block 371, one or more documents may be selected based on the associated concepts. For instance, the car wax advertisement may be selected for display based on an association between the advertisement's selected keyword "car wax" and the search query "car wax polish."

Other factors may be considered in selection, such as price criteria, performance criteria and appropriateness as detailed in U.S. patent application Ser. No. 10/742,791 entitled "Method and System for Providing Targeted Graphical Advertisements" filed Dec. 23, 2003, and in U.S. patent application Ser. No. 10/812,417 (now U.S. Pat. No. 7,533,090) entitled "System and Method for Rating Electronic Documents" filed Mar. 30, 2004.

In block 381, a rank and position may be determined for the one or more documents. In many embodiments, a rank is determined only when more than one document is selected in block 371. For instance, the documents may be provided in an ordered list (from the top down), and some documents may have specific other positions (e.g., a banner at the top of a web page). The rank and position may be determined based on price and performance information. For instance, a document with a high bid on a keyword may have a higher rank (and/or have a more prominent position) than a document with a lower bid on the same keyword when the documents are provided in response to the keyword.

In block 391, the document may be passed to a user or content provider. In many embodiments, the document is passed to the entity that requested the document. For instance, it may be passed to the user who submitted the search query. For instance, the document (or document link) may displayed as an image ad 1 in the search result page 3 shown in FIG. 4.

It will be appreciated by those skilled in the art that the acts described may be performed by hardware, software, or a combination thereof, with or without human intervention, as may be embodied in one or more computing systems such as a server 2 system coupled to entities such as providers, associating entities, databases, and end users. Further, it should be appreciated that not all of the blocks must be accomplished. Also, it is not necessary that the action(s) of each block be performed in the order shown in FIG. 3. Any order of performance may be considered, and some of the actions may overlap other actions.

Illustrative User Interface and Results

Figure 4:
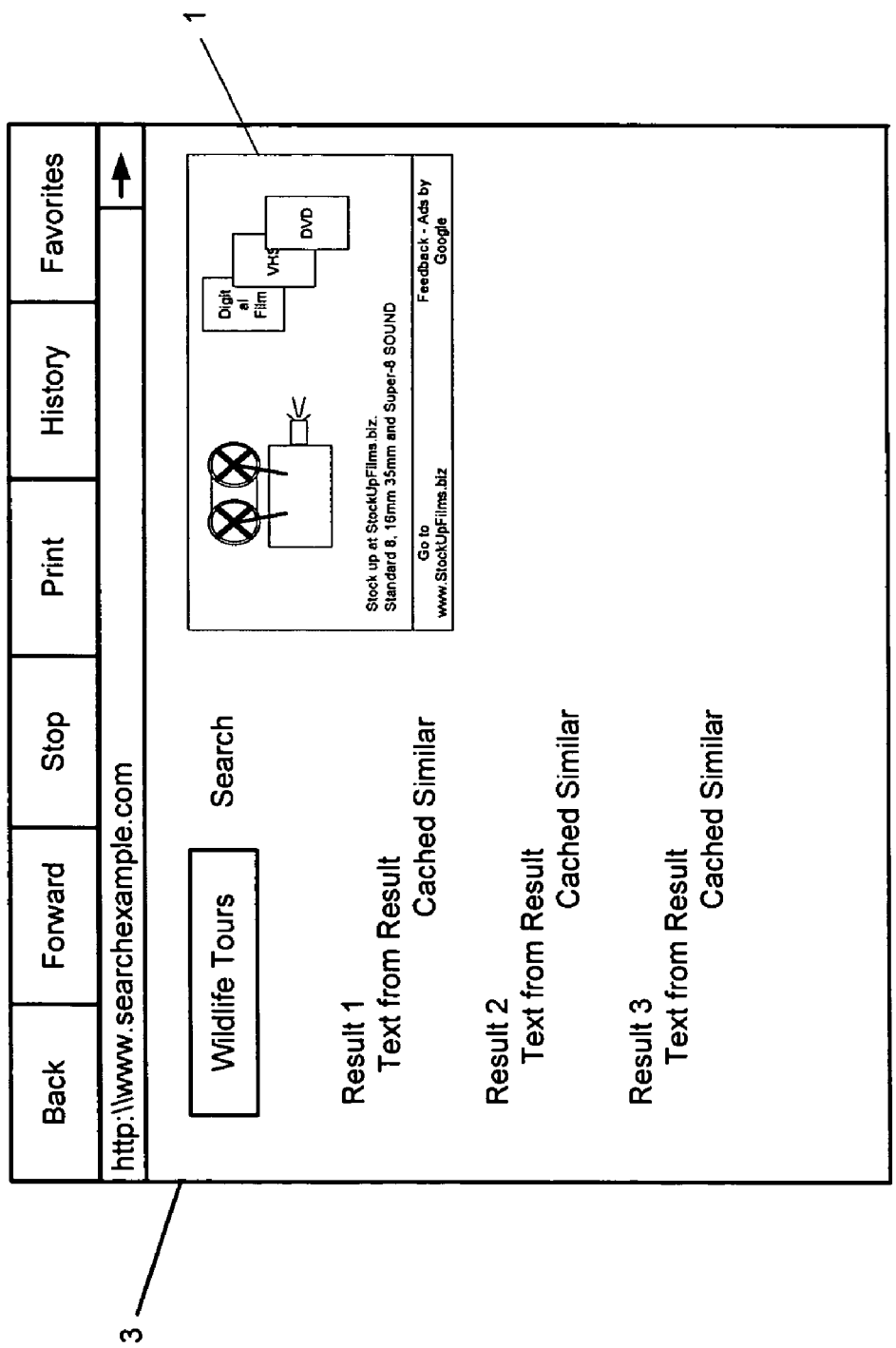
FIG. 4 depicts an exemplary document according to an embodiment of the invention.

FIG. 4 shows an exemplary document 1 according to an embodiment of the invention. FIG. 4 depicts an exemplary web page search result 3 from an Internet search engine. The web page 3 may be a document. Content on the web page 1 may also be a document. For instance, advertisement 1 on the search result page 3 may also be a document. Other types of documents may be considered, such as advertisements, files, programs, and other information.

The document may have various types of content. For instance, the document may have words, images, sounds, and other information, as well as functions or programs, which may dynamically produce words, images, sounds, and other information. Each document may have different amounts of various types of content, such as sexual content, violent content, drug or alcohol-related content, financial content, adult-related content, child-related content, and other content.

Figure 5:
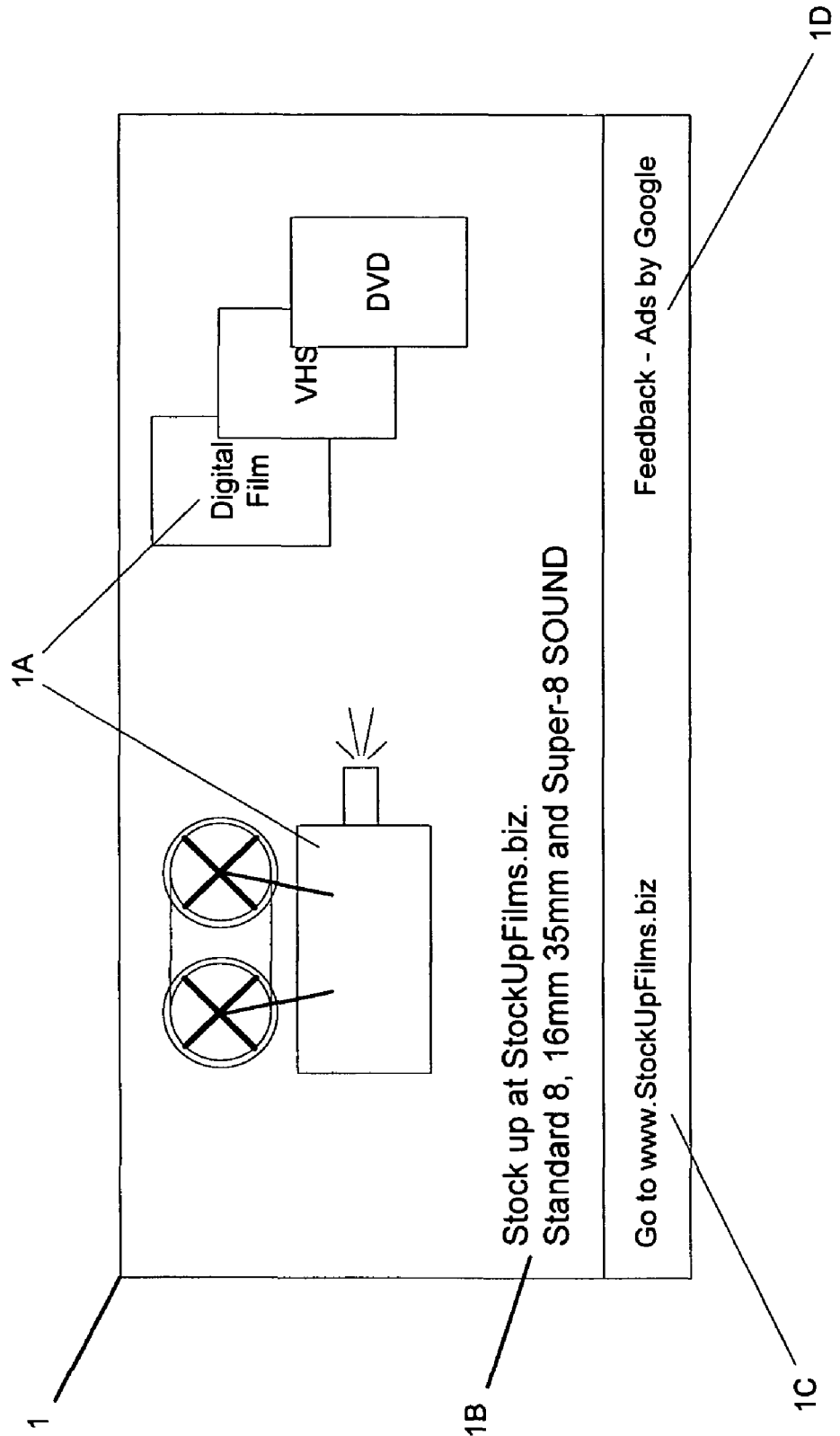
FIG. 5 depicts an exemplary image according to an embodiment of the invention.

FIG. 5 depicts an exemplary image advertisement document 1 according to an embodiment of the invention. The image ad 1 may comprise a banner ad, another ad that can be displayed on a web page, or another graphical advertisement that can be displayed via an electronic means. The image ad 1 shows specific images 1A, ad text 1B, one or more links 1C, and a mechanism 1D for rating the document 1. The specific images 1A comprise a film projector and images of a DVD, VHS, and digital film container. The text 1B comprises an advertisement message, e.g., a description of a product or service, a suggestion to a potential customer, and/or other advertising text. The link 1C may comprise a link to another document, such as the advertiser's web page URL (or portion thereof). For instance, the link 1C may comprise an embedded hypertext link, and the embedded link may be associated with the link 1C displayed in the image of the document 1. In some embodiments, selecting (e.g., clicking on) the displayed URL or other link while viewing the document 1 (e.g., in a web browser) may direct the viewer's mechanism for viewing documents (e.g., web browser) to the content associated with the link (e.g., the advertiser's web page).

The document 1 may explicitly display the link 1C. Alternately, the link 1C may be embedded in the document (e.g., in the programming of the document) or a portion thereof such that the link 1C is not visible. Here, selecting (e.g., clicking on) the document 1, an image 1A, text 1B, or another portion of the document may direct a user's document viewing mechanism to the linked document(s). The document 1 itself, images 1A, and text 1C may also comprise one or more links 1C. For instance, an ad that advertises a plurality of products may comprise a link for each product, wherein selecting (e.g., clicking on) an image 1A, icon 1A, or text 1B relating to a specific product may direct a web browser (or other document viewing mechanism) to a page at a merchant's site associated with the specific product (or to another document).

The mechanism 1D may comprise a link for providing concept association information. For instance, selection of the mechanism 1D (e.g., clicking on the link 1D) may direct the document viewer to an email or web page where the user may provide concept association information. For instance, the web page may comprise prompts for providing concept association information or otherwise request concept association information. Other mechanisms 1D for providing a communication link between an associating entity and server 2 may be contemplated herein.

FIG. 6 depicts an exemplary document showing an ordered ranking according to an embodiment of the invention. Like FIG. 4, FIG. 6 shows an exemplary document 1 according to an embodiment of the invention, namely an exemplary web page 3 search result from an Internet search engine. The web page 3 may be a document. Content on the web page 1 may also be a document. For instance, advertisement 1 on the search result page 3 may also be a document.

FIG. 6 shows two advertisements 1E, 1F in an ordered ranking on the page 1. Advertisements 1E, 1F may be text or image ads or other documents. Here, advertisement 1E is listed above advertisement 1F. For instance, ad 1E may have a higher rank than ad 1F as determined by rank module 38. There may be any number of documents 1E, 1F, each displayed in an order (i.e., ranking) on the web page 3.

FIGS. 7-10 show exemplary interfaces according to an embodiment of the invention. A server may provide the interface documents of FIGS. 7-10 to an ad purchaser on a webpage. An ad purchaser may comprise an individual or company representative who wants to purchase and/or create a text or image ad, or it may comprise any entity that may select an ad or cause an ad to be created.

The interfaces of FIGS. 7-10 may provide inputs to the ad purchaser so that the ad purchaser may select various criteria related to the ad, as described below. Each of FIGS. 7-10 may be used singly or in combination with one or more of the other FIGS. 7-10. For instance, one or more of the documents displayed in FIGS. 7-10 may link to one or more other documents displayed in FIGS. 7-10. The documents shown in FIGS. 7-10 may comprise links to other documents, help tools, and other document elements commonly known in the art. The documents may be hosted by the server 2 or the server's 2 agent, and the documents may be accessible through the server's website or through other electronic means. Although these figures are described in relation to a server 2 and ad purchaser, it should be appreciated that the documents described in FIGS. 7-10 may be used for a variety of parties.

FIG. 7 shows a document 700 containing input fields for creating a text and/or image advertisement. The document 700 allows an ad purchaser to provide inputs for creating a text ad or for creating an image ad. For creating a text ad, the input fields of document 700 enable an ad purchaser to input/select a headline 710 for the ad, ad description line(s) 720, display URL 730, and destination URL 740. The headline 710 may be displayed prominently in the ad, or it may be displayed at the top of the ad or otherwise "headline" the ad. When the text ad is displayed, selecting the display URL 730 (which may be displayed in the ad) may cause a user's browser to be directed to the destination URL 740, which may be the same as (or different from) the display URL 730. For instance, the display URL 730 for an ad for a company's widget may be "www.company.com" while the destination URL 740 for the ad may be "www.company.com/product/display/widget". The document 700 may also show a sample text ad 4.

Document 700 may enable inputs/selections for image ads as well as text ads (or other ads). Different inputs may be used when the ad purchaser supplies an image for the ad compared to situations where the ad purchaser does not supply an image. The document 700 may enable users to select an image ad wizard document to guide the ad purchaser in selecting an image for the ad (see FIGS. 8-10). The image ad inputs available to the ad purchaser include a view input 750 for selecting resolution and/or other view characteristics of the ad, image input 760 for inputting an image for the ad, and image name 770, in addition to inputs available for text ads such as display URL 730 and destination URL 740. Document 700 may provide a browse input 780 for browsing a database (e.g., a hard drive of the ad purchaser's computer or another database) from which to input an image, e.g., by uploading the image to the server 2. Document 700 may also provide a save input 790 for saving the text or image ad to a file, e.g., a file in a server database 50.

Figure 8:
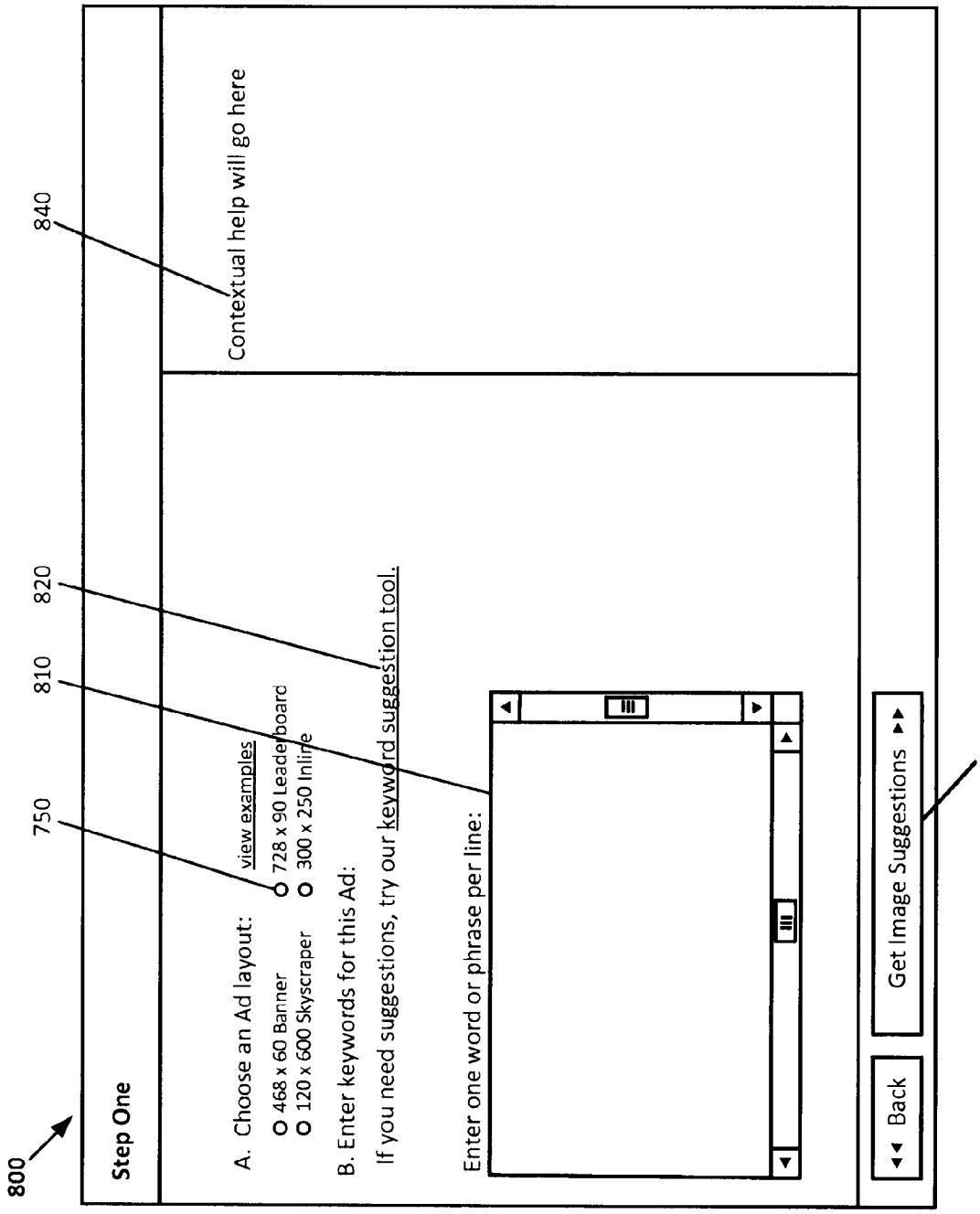
FIG. 8 shows an exemplary interface according to an embodiment of the invention.

FIG. 8 shows a document 800 that allows an ad purchaser to input image preferences. A view input 750 allows the ad purchaser to select a resolution or layout for the ad, such as 468×60 banner ad, 120×600 skyscraper ad, 728×80 leaderboard ad, and 300×250 inline ad. A keyword input 810 may enable the ad purchaser to provide keywords that may be associated with the ad by the server. Selecting a keyword suggestion tool input 820 may direct the ad purchaser to one or more keyword suggestion tool documents 1100-1300, and/or it may cause the server 2 to provide one or more suggested keywords. The server 2 may generate or select suggested keywords based on the information received from the ad purchaser, such as the purchaser's ad heading, description, URL, etc.

After the ad is created, the ad may be selected for display by the server 2 based on one or more keywords associated with the ad. For instance, if a requestor requests a document associated with a concept, the server 2 may provide the ad to the requestor if the ad is associated with one or more keywords related to the concept. The server may select the ad from among a plurality of ads based on the ad's (or the ad's keywords') relevance to the concept and also based on one or more bid amounts for the one or more keywords. For instance, the requestor may request search results related to a specific search query concept that comprises a plurality of search terms. The server 2 may receive the request and provide search results along with one or more ads that are associated with the highest bids on the terms in the search query.

Figure 9:
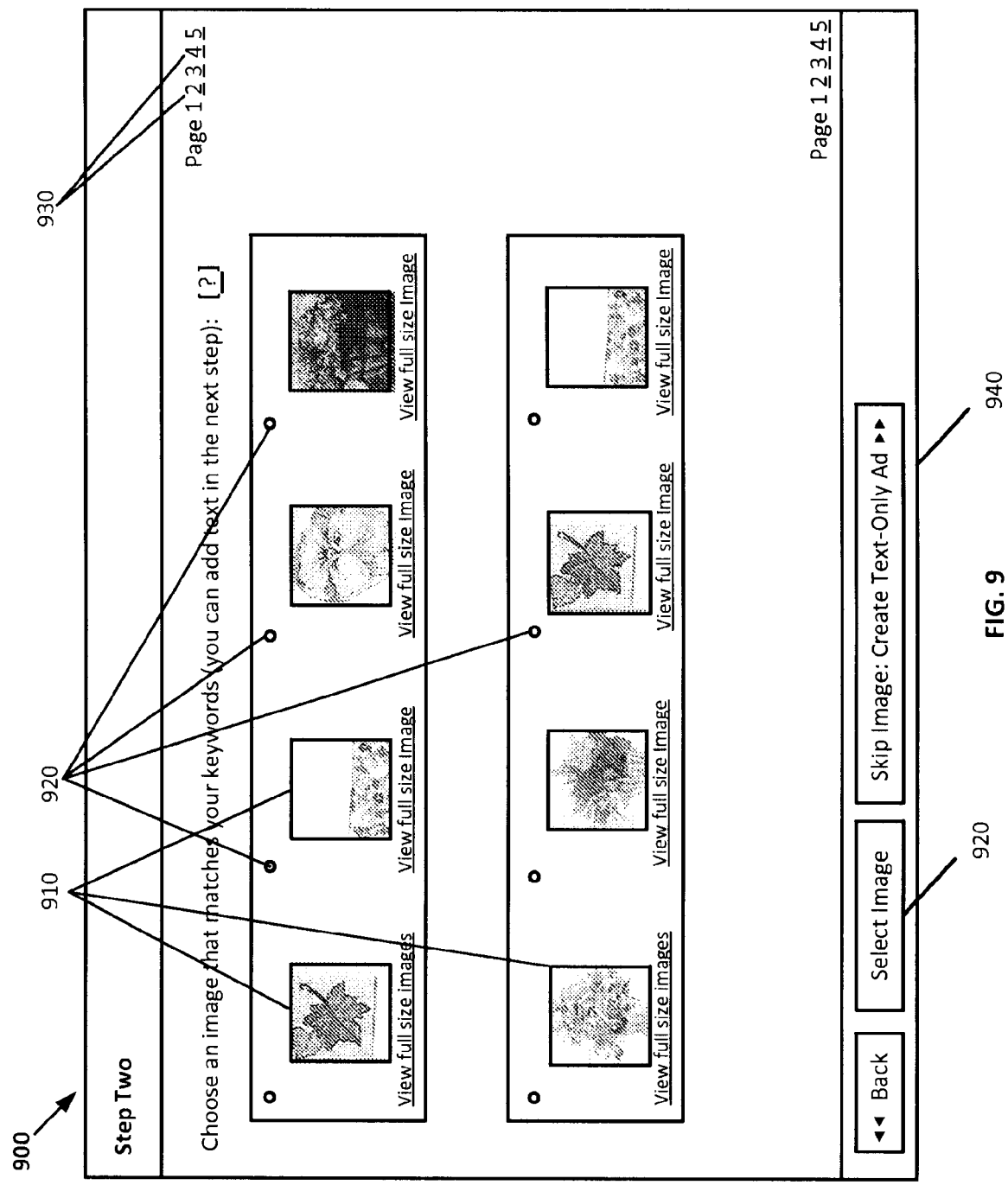
FIG. 9 shows an exemplary interface according to an embodiment of the invention.

The document 800 may also comprise image suggestion request input 830, which may cause the server 2 to display a document 900 that comprises one or more suggested images that may be used in the ad (see FIG. 9). The ad purchaser may then select one or more of the suggested images for use in the ad. The document 800 may also display contextual help 840 that may comprise information related to the ad creation process and/or related to the ad purchaser's selections and inputs.

FIG. 9 shows a document 900 that displays one or more images 902 (e.g., suggested images) that may be used in the ad. The document 900 may be displayed in response to an ad purchaser's request to view or select a suggested image. The images 910 may be selected by the server 2 in any manner described herein; e.g., the images may be selected based on user associations that associate the images with one or more keywords or other concepts. The document 900 may comprise an image selector input 920 that allows the ad purchaser to select one or more of the displayed images 910 for inclusion in the image ad. The document 900 may also comprise one or more links 930 to additional images 910 (e.g., additional pages of images 910).

The document 900 may also provide a text ad selector input 940 for enables the ad purchaser to cancel the image ad process and instead provide text ad inputs (e.g., in document 800).

Figure 10:
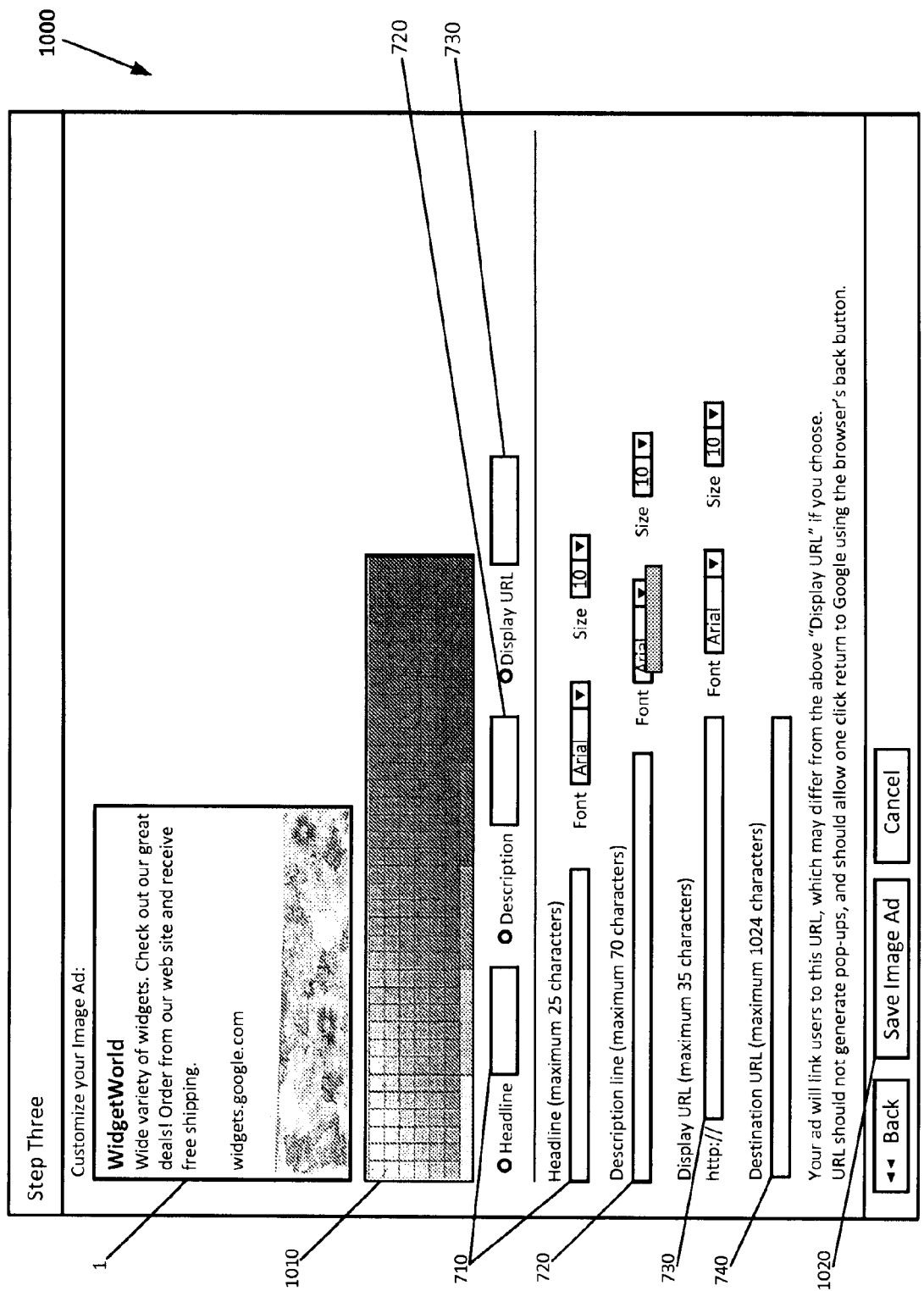
FIG. 10 shows an exemplary interface according to an embodiment of the invention.

FIG. 10 shows a document 1000 that enables an ad purchaser to customize an image ad 1. The document 1000 may comprise a color palette 1010 for selecting colors to be used in the ad, such as the background or foreground of the ad. The headline, description, and display URL components of the ad may be customized separately. For creating a text ad, the input fields of document 1000 enable an ad purchaser to input/select a headline 710 for the ad, ad description line(s) 720, display URL 730, and destination URL 740. The display of each of these features may be customized by font and size, as well as other display attributes. The document 1000 may also comprise a save input 1020 for saving the ad (or other progress) to a database, such as a server database 50 or a database on the ad purchaser's computer system.

Figure 12:
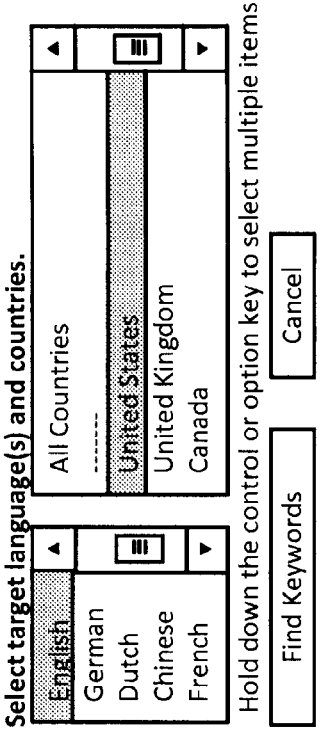
FIG. 12 shows an exemplary interface according to an embodiment of the invention.

FIGS. 11-13 show an exemplary concept request template according to an embodiment of the invention. Specifically, FIGS. 11-13 show exemplary keyword suggestion tool documents 1100-1300 that may enable the ad purchaser to select a keyword appropriate to the ad purchaser's preferences, including price, language, concept relevance, number of keywords, etc.

FIG. 11 shows a keyword suggestion tool 1100 that may enable an ad purchaser to specify a type of keyword to associate with the ad. The server 2 may suggest keywords based on the purchaser's inputs in document 1100. If an ad purchaser selects a "high traffic" option, the server 2 may find synonyms to a keyword associated with an ad so that the ad can be associated with additional, related keywords. If an ad purchaser selects a "high clickthrough rate" option, the server 2 may find more specific variations of a keyword. If an ad purchaser selects a "match type comparison" option, the server 2 may show exemplary document requests that trigger the ad based on selected keywords (e.g., keywords selected in the high traffic or high clickthrough rates options).

Keyword suggestion tool 1100 may enable ad purchasers to provide one or more keywords or images to the server 2 during the keyword suggestion process. For instance, the user may elect to provide an image, at which point the server 2 may prompt the ad purchaser for the image (see keyword suggestion tool 1200 in FIG. 12). The server 2 may then process the provided keywords and/or images to identify additional keywords and concepts related to the provided images and/or keywords that may be associated with the ad.

A language input 1110 may enable an ad purchaser to select one or more languages for the keywords. The server 2 may suggest keywords of the selected language(s). A keyword request input 1120 enables ad purchasers to request suggested keywords. In response to this input, the server 2 may process the information input by the ad purchaser and identify potential keywords. The server 2 may display the one or more suggested keywords to the ad purchaser (e.g., in another document), and the ad purchaser may select one or more of these keywords for inclusion in the ad.

FIG. 12 shows a keyword suggestion tool 1200 that includes an image prompt 1210 that prompts the ad purchaser for an image. It should be appreciated that tool 1200 may alternately (or in addition) prompt for a keyword at prompt 1210. Keyword suggestion tool 1200 may also have similar features to document 1100.

FIG. 13 shows a keyword-image suggestion tool 1300 for identifying keywords associated with a supplied image. The keyword-image suggestion tool 1300 may display an image 1A, such as an image provided by (or selected by) an ad purchaser (e.g., via document 700 or document 900). The keyword-image suggestion tool 1300 may enable ad purchasers to find keywords related to (e.g., similar to or descriptive of) the supplied image. A format input 1310 may enable ad purchasers to select to view the image in a different format, e.g., a different size or resolution. The document 1300 may comprise instructions 1320 for selecting keywords. For instance, the instructions 1320 may instruct ad purchasers to highlight (or otherwise select) one or more keywords provided in a keyword suggestion list 1330. The document 1300 may also display the selected keywords in a selected keyword list 1340. Ad purchaser inputs may be saved at any time, e.g., via save input 1020.

Accordingly, the documents of FIGS. 7-13 may enable ad purchasers to input ad information, and view suggested ads and keywords, and modify those ads and keywords. Using these documents, ad purchasers may create one or more ads relating to one or more products and services, such as an entire ad campaign for a product.

It should be appreciated that while text and image advertisements are used as an example herein, the systems and methods described herein may apply equally to other types of documents, such as web pages, emails, and other electronic documents.

It should be understood that the server, processors, and modules described herein may perform their functions (e.g., comparing a document to another document or determining concept association information) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to image ads, the principles herein are equally applicable to other documents, such as websites. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A computer-implemented method for associating an electronic image document with a concept, comprising:
   receiving one or more search queries;
   for each query, identifying a plurality of image electronic documents associated with a given search query where a given image electronic document is to be associated with a given query based at least in part on the query being resolved to and responsive to the submitted query forming part of a responsive search result and providing a listing of the plurality of documents as a search result;
   receiving a user indication of a selection of one or more of the identified documents responsive to a presentation of the search result;
   automatically identifying one or more concepts derived from the search query and one or more electronic image documents that were provided as being responsive to the search query based at least in part on the prior selection of the electronic image documents after presentation as search results;
   creating and storing, using at least one processor, an association between at least one of the one or more electronic image documents and concepts associated with the one or more electronic image documents;
   after storing the association, receiving a new query for electronic image documents independently of receipt of the one or more queries used to derive the concept associated with the one or more electronic image documents;
   determining that the image document query is related to the concept derived from the stored one or more queries that are associated with the one or more electronic image documents; and
   identifying at least one of the one or more electronic image documents as satisfying the image document query based upon determining that the image document query is related to the concept.

2. The method of claim 1, further comprising:
   receiving a request for an electronic image document associated with a subject matter of interest associated with the concept; and
   delivering at least one of the one or more electronic image documents based on the association between the concept and the subject matter of interest.

3. The method of claim 1, wherein each association comprises a selection of one of the one or more image documents from among a plurality of image documents associated with one of the one or more queries by one of the one or more users.

4. The method of claim 1, wherein each of the one or more queries comprises an interne search query, and wherein each association comprises an association between an electronic image document comprising a selected search result document and the search query.

5. The method of claim 4, wherein the selected search result electronic image document comprises an image selected from among a plurality of images associated with the search query, and the plurality of images are provided from a database of images based on an association between the plurality of images and the concept.

6. The method of claim 5, wherein the act of associating comprises identifying content of an image based on the one or more associations, and wherein the concept is representative of the content of the image.

7. The method of claim 1, further comprising storing the one or more selected images in a database of images.

8. The method of claim 7, further comprising:
   receiving a request for an image advertisement associated with a subject matter of interest; and
   suggesting one or more of the selected images for use in the image advertisement based on an association between the subject matter of interest and the concept.

9. The method of claim 7, wherein the concept comprises a keyword, further comprising:
   receiving a request for an image advertisement associated with a graphic;
   processing the graphic to determine that at least one of the one or more stored selected images is substantially similar to the graphic; and
   suggesting the keyword for use in the image advertisement based on processing the graphic.

10. The method of claim 1, further comprising:
   determining that an unassociated electronic image document is substantially similar to at least one of the one or more electronic image documents; and
   associating the unassociated electronic image document with the concept based on determining that the unassociated electronic image document is substantially similar to at least one of the one or more electronic image documents.

11. The method of claim 1, further comprising:
generating a database of approved public images based on the one or more associations.

12. The method of claim 11, further comprising:
suggesting one or more of the approved public images for an image advertisement based on a request for an image advertisement.

13. The method of claim 1, wherein the at least one of the one or more electronic image documents comprises at least one of an animation, pop-up ability, sound, voice, and music.

14. The method of claim 1, wherein the one or more associations comprises a selection of a graphic on a web page.

15. The method of claim 1, wherein the one or more associations comprises a selection of a document from a search result document list.

16. The method of claim 1, wherein the one or more associations comprises the selection of a website from among a plurality of websites.

17. The method of claim 1, wherein the at least one associated image document is an encrypted document.

18. The method of claim 1, further comprising:
identifying preference data of a specific one of the one or more users based on at least one association made by the user; and
providing a targeted advertisement to the specific user based on the identified preference data.

19. The method of claim 1, wherein the one or more associations comprises a plurality of associations between a single image and the concept.

20. The method of claim 19, further comprising:
identifying content in the image based on the plurality of associations.

21. The method of claim 1, wherein the electronic image documents are selected from the document corpus based on an idea in the search queries.

22. The method of claim 21, where the idea is a keyword.

23. The method of claim 21, wherein the concept and the idea are different.

24. A system for associating an electronic image document with a concept, comprising:
an input device for receiving one or more electronic image document selections responsive to one or more search queries; determining one or more ideas associated with the selected electronic image documents; and associating one or more ideas with each selected electronic image document;
a database for storing the one or more idea-electronic image document associations; and
a processor for automatically creating an association between at least one of the one or more electronic image documents and a concept derived from a new search query, the association between the one or more electronic image documents and the concept being based on the one or more idea-electronic image document associations, wherein the concept is related to the idea;
wherein subsequent image queries from other users are served based upon correlation of the subsequent queries with the concept, thereby providing the associated one or more electronic image documents.

25. A computer-readable medium encoded with computer program code to associate an electronic image document with a concept, the program code effective to cause one or more machines to perform the following operations:
identify one or more idea-image associations, wherein each idea-image association is based on a selection of an image presented as search results responsive to a search query that includes the idea including identifying one or more image selections that have been presented as search results responsive to requests and identifying a concept associated with a respective one of the image selections;
automatically creating an association between at least one of the one or more images and a concept derived from the search query, the association between the one or more images and the concept being based on the one or more idea-image associations, wherein the concept is related to the idea; and
provide results for subsequent image queries related to the concept, the queries being received from other users and the results including at least one of the associated one or more images.

* * * * *

UNITED STATES PATENT AND TRADEMARK OFFICE
CERTIFICATE OF CORRECTION

| | | |
|---|---|---|
| PATENT NO. | : 8,065,611 B1 | Page 1 of 1 |
| APPLICATION NO. | : 10/880375 | |
| DATED | : November 22, 2011 | |
| INVENTOR(S) | : Wesley T. Chan et al. | |

It is certified that error appears in the above-identified patent and that said Letters Patent is hereby corrected as shown below:

Column 24, Line 30 at Claim 4; replace:
        "queries comprises an interne search query, and wherein each" with
        -- queries comprises an internet search query, and wherein each --

Signed and Sealed this
Third Day of April, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,065,611 B1 | Page 1 of 1 |
| APPLICATION NO. | : 10/880375 | |
| DATED | : November 22, 2011 | |
| INVENTOR(S) | : Chan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this
Twelfth Day of June, 2012

David J. Kappos
*Director of the United States Patent and Trademark Office*